US012682849B2

(12) United States Patent
Kim

(10) Patent No.: US 12,682,849 B2
(45) Date of Patent: Jul. 14, 2026

(54) DISPLAY APPARATUS

(71) Applicant: Samsung Display Co., Ltd., Yongin-si (KR)

(72) Inventor: Keunwoo Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/081,597

(22) Filed: Mar. 17, 2025

(65) Prior Publication Data

US 2026/0011304 A1 Jan. 8, 2026

(30) Foreign Application Priority Data

Jul. 4, 2024 (KR) ........................ 10-2024-0088504

(51) Int. Cl.
*G09G 3/32* (2016.01)
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2310/08* (2013.01)

(58) Field of Classification Search
None
See application file for complete search history.

(56) References Cited

U.S. PATENT DOCUMENTS 10,482,817 B2 11/2019 Kim et al.
2022/0215793 A1* 7/2022 Han ..................... G09G 3/3241
2022/0351673 A1* 11/2022 Kim ......................... G09G 3/32
2023/0011669 A1 1/2023 Lee
2023/0103495 A1* 4/2023 Kim ..................... G09G 3/3233 345/76
2024/0023389 A1 1/2024 Sung et al.
2024/0032356 A1 1/2024 In et al.

FOREIGN PATENT DOCUMENTS

CN 108154846 B 4/2022
KR 10-2023-0008957 A 1/2023
KR 10-2566551 B1 8/2023
KR 10-2024-0008993 A 1/2024
KR 10-2024-0013951 A 1/2024

OTHER PUBLICATIONS

Kim, Keunwoo, et al. "Double-Gate CMOS: Symmetrical-Versus Asymmetrical-Gate Devices," IEEE Transactions On Electron Devices, vol. 48, No. 2, Feb. 2001, pp. 294-299.

* cited by examiner

*Primary Examiner* — Carl Adams
(74) *Attorney, Agent, or Firm* — Womble Bond Dickinson (US) LLP

(57) ABSTRACT

A pixel circuit includes: a driving thin-film transistor including a 1a gate electrode, a 1b gate electrode, and a first semiconductor layer between the 1a gate electrode and the 1b gate electrode in a cross-sectional view; a storage capacitor including a first electrode electrically connected to the 1a gate electrode, and a second electrode spaced from the first electrode; a bias thin-film transistor including a 7a source-drain electrode electrically connected to the 1b gate electrode, and a 7b source-drain electrode configured to receive a bias voltage; and a light-emitting diode including an anode electrically connected to the driving thin-film transistor.

18 Claims, 13 Drawing Sheets

DISPLAY APPARATUS

CROSS-REFERENCE TO RELATED APPLICATION

The present application claims priority to and the benefit of Korean Patent Application No. 10-2024-0088504, filed on Jul. 4, 2024, in the Korean Intellectual Property Office, the entire disclosure of which is incorporated by reference herein.

BACKGROUND

1. Field

Aspects of one or more embodiments of the present disclosure relate to a display apparatus including a pixel circuit in which a deterioration of a display quality may be prevented or reduced, and a method of driving the pixel circuit.

2. Description of the Related Art

A display apparatus displays an image by receiving information about the image. Display apparatuses may be used in displays of small-sized products, such as cellular phones and the like, or as displays of large-sized products, such as televisions and the like.

A display apparatus may include a plurality of pixels, which receive an electrical signal and then emit light, to externally display an image. Each pixel includes a light-emitting element. For example, an organic light-emitting display apparatus may include an organic light-emitting diode as the light-emitting element. Generally, an organic light-emitting display apparatus includes a thin-film transistor and an organic light-emitting diode, which are formed on a substrate, and the thin-film transistor operates with the organic light-emitting diode for directly emitting light.

As such, it may be desirable to prevent or reduce a deterioration of an image quality of the display apparatus.

The above information disclosed in this Background section is for enhancement of understanding of the background of the present disclosure, and therefore, it may contain information that does not constitute prior art.

SUMMARY

One or more embodiments may be directed to a pixel circuit in which a deterioration of a display quality may be prevented or reduced, and a method of driving the pixel circuit. However, the present disclosure is not limited to the above aspects and features.

Additional aspects will be set forth in part in the description which follows and, in part, will be apparent from the description, or may be learned by practice of the presented embodiments of the disclosure.

According to one or more embodiments of the present disclosure, a pixel circuit includes: a driving thin-film transistor including a 1a gate electrode, a 1b gate electrode, and a first semiconductor layer between the 1a gate electrode and the 1b gate electrode in a cross-sectional view; a storage capacitor including a first electrode electrically connected to the 1a gate electrode, and a second electrode spaced from the first electrode; a bias thin-film transistor including a 7a source-drain electrode configured to receive a bias voltage and a 7b source-drain electrode electrically connected to the 1b gate electrode; and a light-emitting diode including an anode electrically connected to the driving thin-film transistor.

In an embodiment, the bias thin-film transistor may be configured to be turned on to apply the bias voltage to the 1b gate electrode.

In an embodiment, when the bias voltage is applied to the 1b gate electrode, a threshold voltage of the driving thin-film transistor may be shifted by the bias voltage.

In an embodiment, the driving thin-film transistor may include a p-type metal-oxide-semiconductor (pMOS) thin-film transistor, and the bias voltage may be a positive voltage.

In an embodiment, the pixel circuit may further include an initialization thin-film transistor electrically connected to the first electrode of the storage capacitor.

In an embodiment, the initialization thin-film transistor may include a second semiconductor layer including an oxide semiconductor.

In an embodiment, a 4b source-drain electrode of the initialization thin-film transistor may be electrically connected to the anode of the light-emitting diode.

In an embodiment, the b source-drain electrode may be electrically connected to the first electrode.

In an embodiment, a 4a source-drain electrode of the initialization thin-film transistor may be electrically connected to an initialization voltage line configured to transmit an initialization voltage.

In an embodiment, the initialization thin-film transistor may include a 4a gate electrode, a 4b gate electrode, and a second semiconductor layer between the 4a gate electrode and the 4b gate electrode in a cross-sectional view.

In an embodiment, the 7b source-drain electrode may be electrically connected to the 4b gate electrode.

In an embodiment, the bias thin-film transistor may be configured to be turned on to apply the bias voltage to the 1b gate electrode and the 4b gate electrode.

In an embodiment, the initialization thin-film transistor may be configured to be turned on by the bias voltage to initialize the anode.

In an embodiment, the initialization thin-film transistor may include an nN-type metal-oxide-semiconductor (nMOS) thin-film transistor.

In an embodiment, the initialization thin-film transistor may include a pMOS thin-film transistor, the bias thin-film transistor may be configured to be turned on or turned off according to a control signal, and the 4b gate electrode may be configured to receive the control signal.

In an embodiment, the second electrode may be electrically connected to a power voltage line configured to transmit a power voltage.

In an embodiment, the pixel circuit may further include: a switching thin-film transistor electrically connected to a 1a source-drain electrode of the driving thin-film transistor; a first emission control thin-film transistor electrically connecting the power voltage line to the driving thin-film transistor; and a second emission control thin-film transistor electrically connected between the anode and the driving thin-film transistor.

According to one or more embodiments of the present disclosure, a method of driving a pixel circuit including a plurality of thin-film transistors including a driving thin-film transistor including a 1a gate electrode and a 1b gate electrode underneath the 1a gate electrode, a storage capacitor including a first electrode and a second electrode, and a light-emitting diode including an anode and configured to emit light according to a driving current received from the driving thin-film transistor, includes: shifting a threshold voltage of the driving thin-film transistor by applying a bias voltage to the 1b gate electrode; applying a driving voltage to the driving thin-film transistor; and transmitting the driving current to the light-emitting diode based on the shifted threshold voltage and the driving voltage.

In an embodiment, the plurality of thin-film transistors may further include an initialization thin-film transistor electrically connected to the anode. The initialization thin-film transistor may include an n-type metal-oxide-semiconductor (nMOS) thin-film transistor including a 4a gate electrode and a 4b gate electrode underneath the 4a gate electrode. The shifting of the threshold voltage may include initializing the anode by applying the bias voltage concurrently to the 1b gate electrode and the 4b gate electrode.

In an embodiment, the plurality of thin-film transistors may further include an initialization thin-film transistor electrically connected to the anode, and a bias thin-film transistor electrically connected to the 1b gate electrode. The initialization thin-film transistor may include a p-type metal-oxide-semiconductor (pMOS) thin-film transistor including a 4a gate electrode and a 4b gate electrode underneath the 4a gate electrode. The bias thin-film transistor may be configured to be turned on or turned off according to a control signal, and the shifting of the threshold voltage may include initializing the anode by applying the control signal to the 4b gate electrode.

However, the present disclosure is not limited to the above aspects and features, and the above and additional aspects and features will be set forth, in part, in the detailed description that follows with reference to the drawings, and in part, may be apparent therefrom, or may be learned by practicing one or more of the presented embodiments of the present disclosure.

BRIEF DESCRIPTION OF THE DRAWINGS

The above and other aspects and features of the present disclosure will be more clearly understood from the following detailed description of the illustrative, non-limiting embodiments with reference to the accompanying drawings, in which.

DETAILED DESCRIPTION

Figure 1:
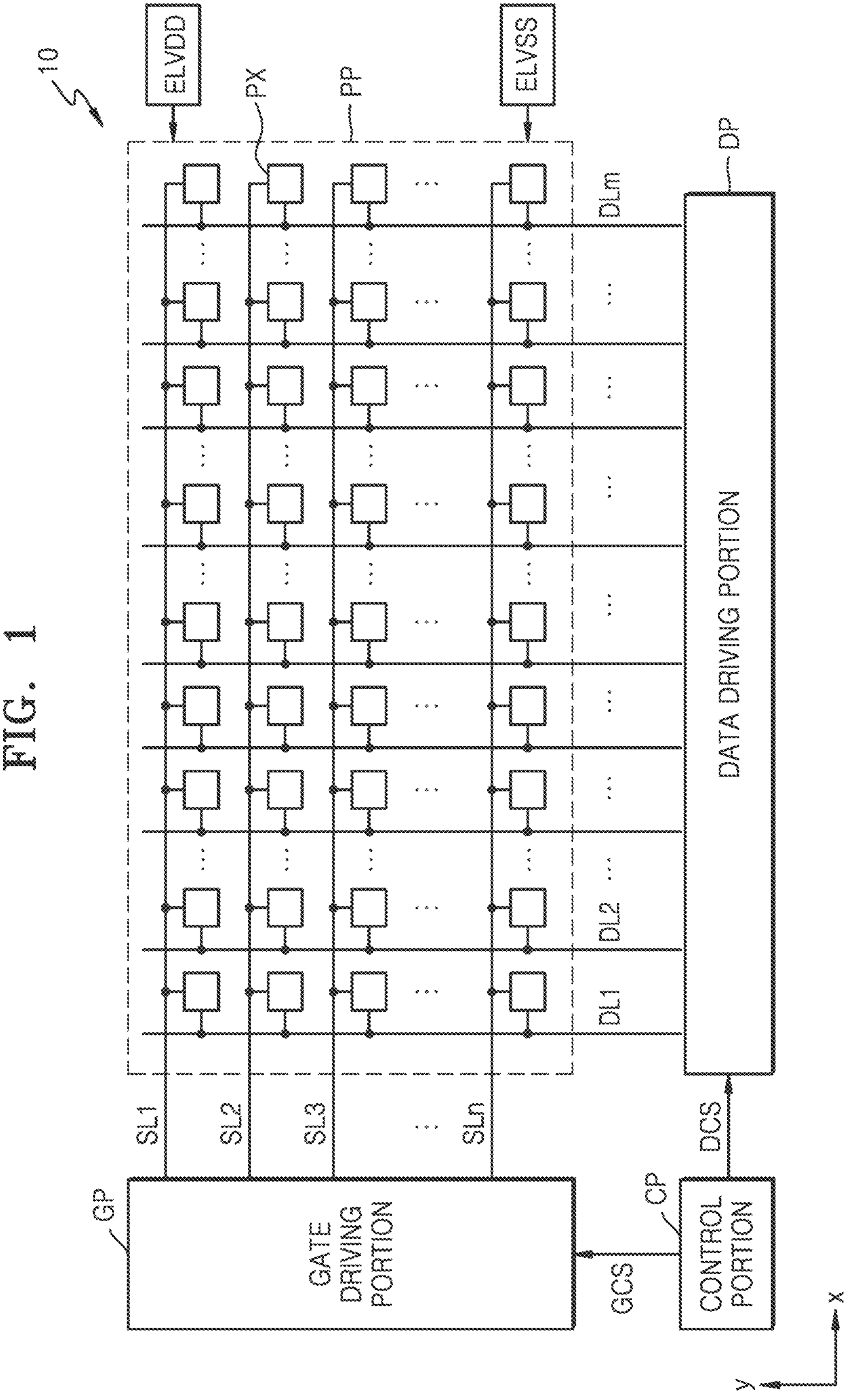
FIG. 1 is a schematic view of a display panel of a display apparatus according to an embodiment.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

Further, as would be understood by a person having ordinary skill in the art, in view of the present disclosure in its entirety, each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner, unless otherwise stated or implied.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it should be expected that the shapes shown in the figures may vary in practice depending, for example, on tolerances and/or manufacturing techniques. Accordingly, the embodiments of the present disclosure should not be construed as being limited to the specific shapes shown in the figures, and should be construed considering changes in shapes that may occur, for example, as a result of manufacturing. As such, the shapes shown in the drawings may not depict the actual shapes of areas of the device, and the present disclosure is not limited thereto.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms “first,” “second,” “third,” etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being “on,” “connected to,” or “coupled to” another element or layer, it can be directly on, connected to, or coupled to the other element or layer, or one or more intervening elements or layers may be present. Similarly, when a layer, an area, or an element is referred to as being “electrically connected” to another layer, area, or element, it may be directly electrically connected to the other layer, area, or element, and/or may be indirectly electrically connected with one or more intervening layers, areas, or elements therebetween. In addition, it will also be understood that when an element or layer is referred to as being “between” two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms “a” and “an” are intended to include the plural forms as well, unless the context clearly indicates otherwise. It will be further understood that the terms “comprises,” “comprising,” “includes,” “including,” “has,” “have,” and “having,” when used in this specification, specify the presence of the stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. For example, the expression “A and/or B” denotes A, B, or A and B. Expressions such as “at least one of,” when preceding a list of elements, modify the entire list of elements and do not modify the individual elements of the list. For example, the expression “at least one of a, b, or c,” “at least one of a, b, and c,” and “at least one selected from the group consisting of a, b, and c” indicates only a, only b, only c, both a and b, both a and c, both b and c, all of a, b, and c, or variations thereof.

As used herein, the term “substantially,” “about,” and similar terms are used as terms of approximation and not as terms of degree, and are intended to account for the inherent variations in measured or calculated values that would be recognized by those of ordinary skill in the art. For example, when a layer is referred to as having “the same layer structure” as another layer, a plurality of layers included in the layer may be included in the other layer by the same order. For example, a plurality of layers included in a layer may include the same material and may be formed by the same order as a plurality of layers included in another layer. Further, the use of “may” when describing embodiments of the present disclosure refers to “one or more embodiments of the present disclosure.” As used herein, the terms “use,” “using,” and “used” may be considered synonymous with the terms “utilize,” “utilizing,” and “utilized,” respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a schematic view of a display panel 10 of a display apparatus according to an embodiment.

As illustrated in FIG. 1, the display panel 10 may include a pixel portion PP, a gate driving portion GP, a data driving portion DP, and a control portion CP.

In a display area DA (e.g., see FIG. 2), the pixel portion PP in which a plurality of sub-pixels PX are arranged may be provided. In a peripheral area PA (e.g., see FIG. 2), the gate driving portion GP, the data driving portion DP, and the control portion CP may be provided.

Each of the plurality of sub-pixels PX may be connected to a corresponding scan line from among a plurality of scan lines SL1 to SLn, and a corresponding data line from among a plurality of data lines DL1 to DLm, where n and m are natural numbers. Each of the plurality of scan lines SL1 to SLn may extend in a first direction (e.g., the x direction or a row direction), and may be connected to the sub-pixels PX arranged in the same row as each other. Each of the scan lines SL1 to SLn may transmit a gate signal to the sub-pixels PX arranged in the same row as each other. Each of the plurality of data lines DL1 to DLm may extend in a second direction (e.g., the y direction or a column direction), and may be connected to the sub-pixels PX arranged in the same column as each other.

The gate driving portion GP may be connected to the plurality of scan lines SL1 to SLn, may generate a gate signal in response to a gate driving control signal GCS from the control portion CP, and may sequentially supply the gate signal to the scan lines SL1 to SLn. When the gate signal is sequentially supplied to the scan lines SL1 to SLn, the sub-pixels PX may be selected in row units (e.g., in a unit of a row). Each of the data lines DL1 to DLm may transmit a data signal DATA to the sub-pixels PX in a selected row. The scan lines SL1 to SLn may be connected to a gate of a transistor included in the sub-pixel PX. The gate signal may be a gate control signal for controlling the turning on and turning off of the transistor connected to the scan line. The gate signal may be a square wave signal repeatedly including an on voltage for turning on the transistor and an off voltage for turning off the transistor.

The data driving portion DP may convert an image signal to a data signal DATA in the form of a voltage or a current, according to a data driving control signal DCS input from the control portion CP.

The control portion CP may generate the data driving control signal DCS and the gate driving control signal GCS according to synchronization signals supplied from the outside. The control portion CP may output the data driving control signal DCS to the data driving portion DP, and may output the gate driving control signal GCS to the gate driving portion GP.

The gate driving portion GP and the control portion CP may be formed (e.g., may be directly formed) on a substrate. The data driving portion DP may be disposed on a flexible printed circuit board (FPCB) electrically connected to a pad arranged at a side of a substrate. According to another embodiment, the data driving portion DP may be disposed (e.g., may be directly disposed) on a substrate as a chip on glass (COG) or a chip on plastic (COP).

Figure 2:
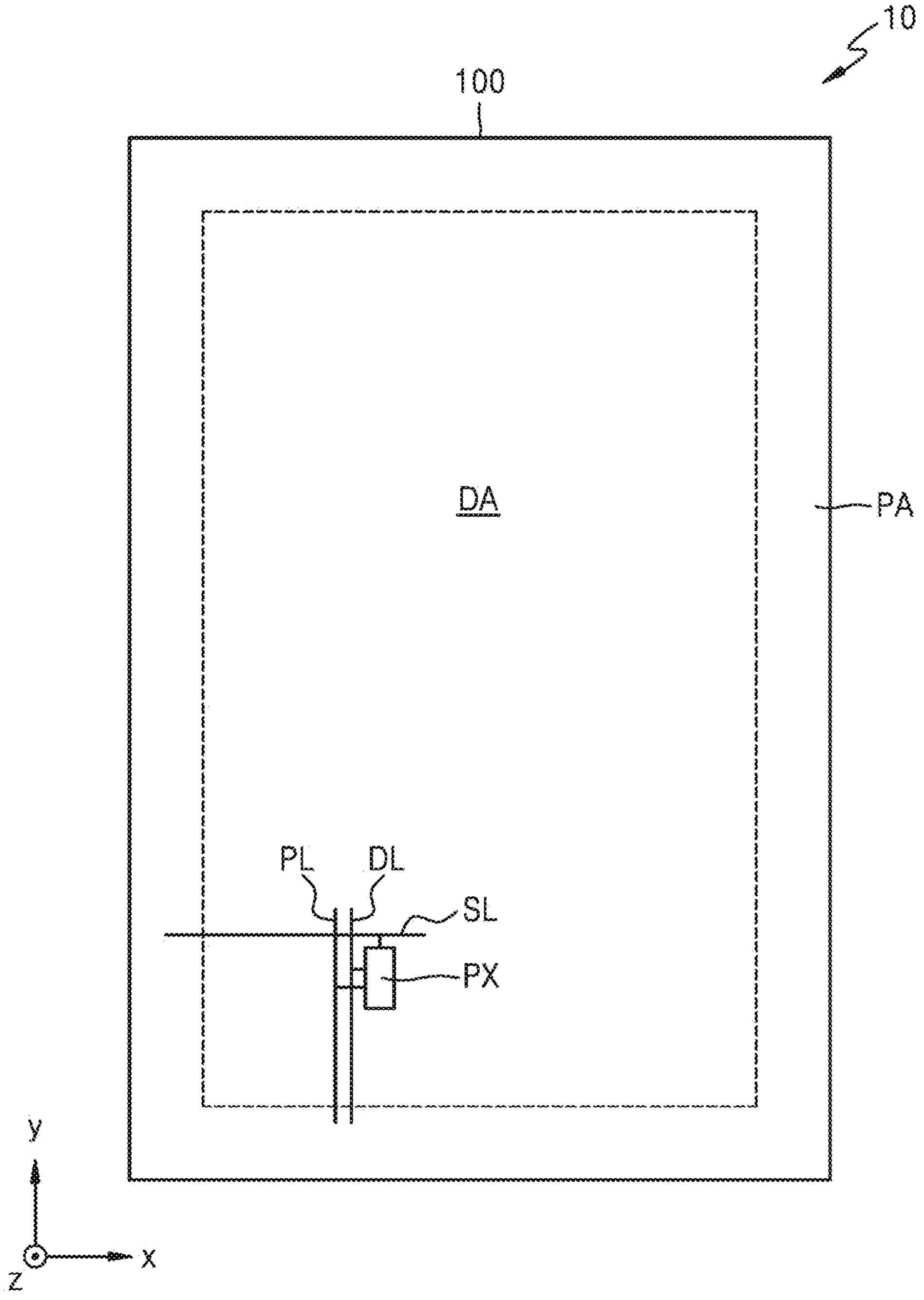
FIG. 2 is a schematic plan view of a display panel according to an embodiment.

FIG. 2 is a schematic plan view of the display panel 10 according to an embodiment.

As illustrated in FIG. 2, the display panel 10 may include the display area DA, and the peripheral area PA outside the display area DA. FIG. 2 illustrates that the display area DA has a rectangular shape. However, the present disclosure is not limited thereto. The display area DA may have other suitable shapes, such as a circular shape, an oval shape, a polygonal shape, a shape of a figure (e.g., a predetermined figure), or the like.

The display area DA may be where an image is displayed, and the plurality of sub-pixels PX may be arranged in the display area DA. Each sub-pixel PX may include a display device, such as an organic light-emitting diode. Each sub-pixel PX may emit, for example, red, green, or blue light. The sub-pixel PX may be connected to a pixel circuit including a thin-film transistor, a storage capacitor, and/or the like. The pixel circuit may be connected to a scan line SL that transmits a scan signal, a data line DL crossing the scan line SL and that transmits a data signal, a driving voltage line PL that supplies a driving voltage, and/or the like. For example, the data line DL and the driving voltage line PL may extend in the y-axis direction (e.g., a first direction), and the scan line SL may extend in the x-axis direction (e.g., a second direction).

The sub-pixel PX may emit light having a desired brightness corresponding to an electrical signal from the pixel circuit electrically connected to the sub-pixel PX. The display area DA may display an image (e.g., a certain or predetermined image) through the light emitted from the sub-pixel PX. For example, the sub-pixel PX may be defined as an emission area for emitting light of any one color of red, green, or blue light.

The peripheral area PA is where the sub-pixel PX is not arranged, and may be where an image is not displayed. A power supply line or the like to drive the sub-pixel PX may be arranged in the peripheral area PA. Also, pads may be arranged in the peripheral area PA, and a PCB including the driving circuit portion or an IC device, such as a driver IC, may be electrically connected to the pads in the peripheral area PA.

For example, the display panel 10 may include a substrate 100 (e.g., see FIG. 3), and thus, the substrate 100 may be understood as including the display area DA and the peripheral area PA. The substrate 100 will be described in more detail below.

A plurality of transistors may be arranged in the display area DA. According to a kind of (e.g., an N type or a P type) and/or an operation condition of the plurality of transistors, a first terminal of the transistor may be a source electrode or a drain electrode, and a second terminal of the transistor may be a different electrode from the first terminal. For example, when the first terminal is a source electrode, the second terminal may be a drain electrode.

Hereinafter, an organic light-emitting display apparatus is described in more detail as a representative example of a display apparatus according to an embodiment. However, the present disclosure is not limited thereto. According to another embodiment, the display apparatus may include an inorganic light-emitting display apparatus, an inorganic electroluminescent (EL) display apparatus, or a quantum dot light-emitting display apparatus. In other words, an emission layer of a display device included in the display apparatus may include an organic material or an inorganic material. Also, the display apparatus may include the emission layer, and quantum dots located on a path of light emitted from the emission layer.

Figure 3:
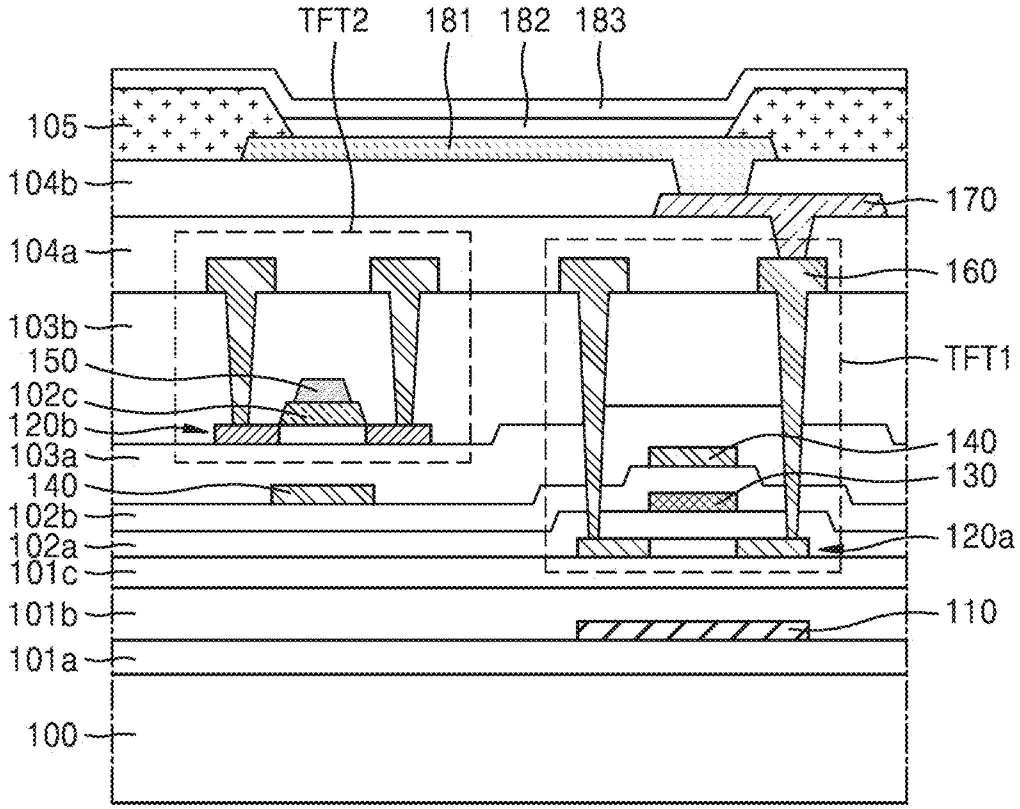
FIG. 3 is a schematic cross-sectional view of a portion of the display apparatus of FIG. 1.

FIG. 3 is a schematic cross-sectional view of a portion of the display apparatus of FIG. 1.

As described above, the substrate 100 may include areas corresponding to the display area DA, and the peripheral area PA outside the display area DA. The substrate 100 may include various suitable flexible or bendable materials. For example, the substrate 100 may include glass, a metal, or one or more polymer resins. For example, the polymer resins may include polyethersulphone, polyacrylate, polyetherimide, polyethylene naphthalate, polyethylene terephthalate, polyphenylene sulfide, polyarylate, polyimide, polycarbonate, or cellulose acetate propionate.

However, the present disclosure is not limited thereto. For example, the substrate 100 may have a multi-layered structure including two layers, each including one or more of the polymer resins described above, and a barrier layer disposed between the two layers and including an inorganic material (e.g., such as silicon oxide, silicon nitride, silicon oxynitride, or the like).

A first barrier layer 101*a* may be disposed on the substrate 100. The first barrier layer 101*a* may include an inorganic material, such as silicon oxide, silicon nitride, and/or silicon oxynitride, and may be disposed between the substrate 100 and a lower metal layer 110 (or a second barrier layer 101*b*). The first barrier layer 101*a* may have a suitable shape corresponding to the entire or substantially entire surface of the substrate 100, and may be formed by chemical vapor deposition (CVD) or atomic layer deposition (ALD). The first barrier layer 101*a* may prevent or substantially prevent a diffusion of impurity ions, may prevent or substantially prevent penetration of moisture or external substances, and may planarize or substantially planarize a surface.

The lower metal layer 110 may be disposed on the first barrier layer 101*a*. The lower metal layer 110 may be disposed below (e.g., disposed under) a first semiconductor layer 120*a*, and may include at least one metal from among Mo, Al, Pt, Pd, Ag, Mg, Au, Ni, Nd, Ir, Cr, Li, Ca, Ti, W, and/or Cu. For example, in a plan view, at least a portion of the lower metal layer 110 may overlap with at least a portion of the first semiconductor layer 120*a*. For example, in a plan view, at least a portion of the lower metal layer 110 may overlap with at least a portion of a first gate layer 130.

The second barrier layer 101*b* may be disposed on the lower metal layer 110. The second barrier layer 101*b* may include an inorganic material, such as silicon oxide, silicon nitride, and/or silicon oxynitride, and may be disposed between the first barrier layer 101*a* and a buffer layer 101*c*. The second barrier layer 101*b* may have a suitable shape corresponding to the entire or substantially entire surface of the substrate 100, and may be formed by CVD or ALD. The second barrier layer 101*b* may prevent or substantially prevent diffusion of impurity ions, may prevent or substantially prevent penetration of moisture or external substances, and may planarize or substantially planarize a surface.

The buffer layer 101*c* may be disposed on the second barrier layer 101*b*. The buffer layer 101*c* may include an inorganic material, such as silicon oxide, silicon nitride, and/or silicon oxynitride, and may be disposed between the second barrier layer 101*b* and the first semiconductor layer 120*a*. The buffer layer 101*c* may planarize or substantially planarize a surface, and may control a heat provision speed during a crystallization process for forming the first semiconductor layer 120*a*, so that the first semiconductor layer 120*a* may be uniformly or substantially uniformly crystallized.

The first semiconductor layer 120*a* may be disposed on the buffer layer 101*c*. The first semiconductor layer 120*a* may include polysilicon (e.g., a low-temperature polycrystalline silicon (LTPS)), and may include a channel area that is not doped with impurities and a source area and a drain area that are doped with impurities at both sides (e.g., opposite sides) of the channel area. The impurities may vary according to the kind of thin-film transistor, and may include N-type impurities or P-type impurities.

A first gate insulating layer 102*a* may be disposed on the first semiconductor layer 120*a*. The first gate insulating layer 102*a* may have an insulating property between the first semiconductor layer 120*a* and the first gate layer 130. The first gate insulating layer 102*a* may include an inorganic material, such as silicon oxide, silicon nitride, and/or silicon oxynitride, and may be disposed between the first semiconductor layer 120*a* and the first gate layer 130. The first gate insulating layer 102*a* may have a suitable shape corresponding to the entire or substantially entire surface of the substrate 100, and may have contact holes in a portion (e.g., in a predetermined portion) thereof. The first gate insulating layer 102*a* may be formed by CVD or ALD.

The first gate layer 130 may be disposed on the first gate insulating layer 102*a*. The first gate layer 130 may be disposed above the first semiconductor layer 120*a* to overlap with the first semiconductor layer 120*a*, and may include at least one metal from among Mo, Al, Pt, Pd, Ag, Mg, Au, Ni, Nd, Ir, Cr, Li, Ca, Ti, W, and/or Cu.

A second gate insulating layer 102*b* may be disposed on the first gate layer 130. The second gate insulating layer 102*b* may have an insulating property between the first gate layer 130 and a second gate layer 140. The second gate insulating layer 102*b* may include an inorganic material, such as silicon oxide, silicon nitride, and/or silicon oxynitride, and may be disposed between the first gate layer 130 and the second gate layer 140. The second gate insulating layer 102*b* may have a suitable shape corresponding to the entire or substantially the entire surface of the substrate 100, and may have contact holes in a portion (e.g., in a predetermined portion) thereof. The second gate insulating layer 102*b* may be formed by CVD or ALD.

The second gate layer 140 may be disposed on the second gate insulating layer 102*b*. In a plan view, the second gate layer 140 may be disposed above the first gate layer 130 and/or a second semiconductor layer 120*b* to overlap with the first gate layer 130 and/or the second semiconductor layer 120*b*, and may include at least one metal from among Mo, Al, Pt, Pd, Ag, Mg, Au, Ni, Nd, Ir, Cr, Li, Ca, Ti, W, and/or Cu. The display panel 10 may further include another gate layer disposed on a different layer.

A first interlayer insulating layer 103*a* may be disposed on the second gate layer 140. The first interlayer insulating layer 103*a* may cover the second gate layer 140. The first interlayer insulating layer 103*a* may include an inorganic material. For example, the first interlayer insulating layer 103*a* may include a metal oxide or a metal nitride. In more detail, the inorganic material may include silicon oxide ($SiO_2$), silicon nitride ($SiN_x$), silicon oxynitride (SiON), aluminum oxide ($Al_2O_3$), titanium oxide ($TiO_2$), tantalum oxide ($TA_2O_5$), hafnium oxide ($HfO_2$), zinc oxide ($ZnO_2$), or the like. For example, the first interlayer insulating layer 103*a* may have a dual structure of $SiO_x/SiN_y$ or $SiN_x/SiO_y$.

The second semiconductor layer 120*b* may be disposed on the first interlayer insulating layer 103*a*. The second semiconductor layer 120*b* may include polysilicon (e.g., LTPS) or an oxide semiconductor layer (e.g., IGZO, IZO, and/or the like). The second semiconductor layer 120*b* may include a channel area, which is not doped with impurities, and a source area and a drain area, which are doped with impurities at both sides (e.g., opposite sides) of the channel area. For example, when the second semiconductor layer 120*b* includes polysilicon, the impurities may vary according to the kind of thin-film transistor, and may include N-type impurities or P-type impurities. For example, when the second semiconductor layer 120*b* is an oxide semiconductor layer, the second semiconductor layer 120*b* may generally include a P-type semiconductor layer.

A third gate insulating layer 102*c* may be disposed on the second semiconductor layer 120*b*. The third gate insulating layer 102*c* may have an insulating property between the second semiconductor layer 120*b* and a third gate layer 150. The third gate insulating layer 102*c* may include an inorganic material, such as silicon oxide, silicon nitride, and/or silicon oxynitride, and may be disposed between the second semiconductor layer 120*b* and the third gate layer 150. The third gate insulating layer 102*c* may overlap with a portion of the second semiconductor layer 120*b*. Alternatively, the third gate insulating layer 102*c* may have a suitable shape corresponding to the entire or substantially the entire surface of the substrate 100, and may have contact holes in a portion (e.g., in a predetermined portion) thereof. The third gate insulating layer 102*c* may be formed by CVD or ALD.

The third gate layer 150 may be disposed on the third gate insulating layer 102*c*. The third gate layer 150 may be disposed above the second semiconductor layer 120*b* to overlap with the second semiconductor layer 120*b*, and may include at least one metal from among Mo, Al, Pt, Pd, Ag, Mg, Au, Ni, Nd, Ir, Cr, Li, Ca, Ti, W, and/or Cu.

A second interlayer insulating layer 103*b* may be disposed on the third gate layer 150. The second interlayer insulating layer 103*b* may cover the third gate layer 150 and/or the first interlayer insulating layer 103*a*. The second interlayer insulating layer 103*b* may include an inorganic material. For example, the second interlayer insulating layer 103*b* may include a metal oxide or a metal nitride. In more detail, the inorganic material may include $SiO_2$, $SiN_x$, SiON, $Al_2O_3$, $TiO_2$, $Ta_2O_5$, $HfO_2$, or $ZnO_2$. For example, the second interlayer insulating layer 103*b* may have a dual structure of $SiO_x/SiN_y$ or $SiN_x/SiO_y$.

A first conductive layer 160 may be disposed on the second interlayer insulating layer 103*b*. The first conductive layer 160 may perform a function of (e.g., may include or be) an electrode connected to the source area and the drain area of the first semiconductor layer 120*a* and/or the second semiconductor layer 120*b* through a via-hole in the second interlayer insulating layer 103*b* and/or a via-hole in the first interlayer insulating layer 103*a* and the second interlayer insulating layer 103*b*.

The first conductive layer 160 may include one or more metals selected from among Al, Pt, Pd, Ag, Mg, Au, Ni, Nd, Ir, Cr, Li, Ca, Mo, Ti, W, and/or Cu. For example, the first conductive layer 160 may include a Ti layer, an Al layer, and/or a Cu layer. For example, the first conductive layer 160 may include a Ti/Al/Ti structure.

A first organic insulating layer 104*a* may be disposed on the first conductive layer 160. The first organic insulating layer 104*a* may cover an upper portion of the first conductive layer 160, and may have an approximately flat upper surface to serve as a planarization layer. The first organic insulating layer 104*a* may include, for example, an organic material, such as acryl, benzocyclobutene (BCB), or hexamethyldisiloxane (HMDSO). The first organic insulating layer 104*a* may include a single layer or a plurality of layers, and may be variously modified as needed or desired.

A second conductive layer 170 may be disposed on the first interlayer insulating layer 104*a*. The second conductive layer 170 may be connected, through a via-hole in the first organic insulating layer 104*a*, to a portion of a first conductive layer 160 that is connected to the first semiconductor layer 120*a*, so as to perform a function of (e.g., to include or be) an electrode.

The second conductive layer 170 may include one or more metals selected from among Al, Pt, Pd, Ag, Mg, Au, Ni, Nd, Ir, Cr, Li, Ca, Mo, Ti, W, and/or Cu. For example, the second conductive layer 170 may include a Ti layer, an Al layer, and/or a Cu layer. For example, the second conductive layer 170 may include a Ti/Al/Ti structure.

The display panel 10 may further include another conductive layer disposed on a different layer from the first and second conductive layers 160 and 170, and the other conductive layer may be, for example, a line layer to perform a function of (e.g., including or being) a line.

A second organic insulating layer 104*b* may be disposed on the second conductive layer 170. The second organic insulating layer 104*b* may cover an upper portion of the second conductive layer 170, and may have an approximately flat upper surface to serve as a planarization layer. The second organic insulating layer 104*b* may include, for example, an organic material, such as acryl, BCB, or HMDSO. The second organic insulating layer 104*b* may include a single layer or multiple layers, and may be variously modified as needed or desired.

A pixel electrode layer 181 may be disposed on the second organic insulating layer 104*b*. The pixel electrode layer 181 may be connected to the second conductive layer 170 through a contact hole formed in the second organic insulating layer 104*b*. A display device may include the pixel electrode realized for each sub-pixel through the pixel electrode layer 181. For example, a light-emitting diode, such as an organic light-emitting diode, may be used as the display device. For example, an organic light-emitting diode may further include an intermediate layer 182, and the intermediate layer 182 may be disposed on a pixel electrode realized for each sub-pixel through the pixel electrode layer 181. For example, the pixel electrode layer 181 may include a transmissive conductive layer including a transmissive conductive oxide, such as ITO, $In_2O_3$, or IZO, and/or a reflective layer including a metal, such as Al or Ag. For example, the pixel electrode layer 181 may have a triple-layered structure of ITO/Ag/ITO.

A pixel-defining layer 105 may be disposed above the second organic insulating layer 104*b*, and may be disposed to cover an edge of the pixel electrode realized for each sub-pixel through the pixel electrode layer 181. For example, the pixel-defining layer 105 may cover the edge of the pixel electrode realized for each sub-pixel. The pixel-defining layer 105 may have an opening portion corresponding to the sub-pixel, and the opening portion may be formed to expose at least a central portion of the pixel electrode realized for each sub-pixel. The opening portion may be defined by the pixel-defining layer 105.

For example, the pixel-defining layer 105 may include, for example, an organic material, such as polyimide or HMDSO. In some embodiments, a spacer may be disposed on the pixel-defining layer 105. The spacer may be located in the peripheral area PA, but the present disclosure is not limited thereto, and the spacer may be located in the display area DA. The spacer may prevent or substantially prevent damage to the organic light-emitting diode, which may be caused by a sagging of a mask in a manufacturing process using the mask. The spacer may include an organic insulating material, and may include a single layer or multiple layers.

The display device may further include an opposite electrode 183. The intermediate layer 182 and the opposite electrode 183 may be disposed in the opening portion. The intermediate layer 182 may include a low molecular-weight material or a high molecular-weight material. When the intermediate layer 182 includes a low molecular-weight material, the intermediate layer 182 may include a hole injection layer, a hole transport layer, an emission layer, an electron transport layer, and/or an electron injection layer. When the intermediate layer 182 includes a high-molecular-weight material, the intermediate layer 182 may generally have a structure including a hole transport layer and an emission layer.

The structure of the intermediate layer 182 is not limited thereto, and may be variously modified as needed or desired. For example, at least one of the layers included in the intermediate layer 182 may be integrally formed (e.g., may be commonly formed) like the opposite electrode 183. According to another embodiment, the intermediate layer 182 may include layers (patterns) that are patterned to respectively correspond to the plurality of pixel electrodes.

The opposite electrode 183 may include a transmissive conductive layer including a transmissive conductive oxide, such as ITO, $In_2O_3$, or IZO. The pixel electrode may be used as an anode, and the opposite electrode 183 may be used as a cathode. However, the polarities of the electrodes may be the opposite from that described above.

The opposite electrode 183 may be disposed in an upper region of the display area DA, and may be disposed across the entire or substantially the entire surface of the display area DA. The opposite electrode 183 may be integrally formed to cover the plurality of pixel electrodes. The opposite electrode 183 may be electrically connected to a common power supply line arranged in the peripheral area PA. For example, in some embodiments, the opposite electrode 183 may extend to a partition wall.

A first thin-film transistor TFT1 may include the first semiconductor layer 120*a* described above. The first thin-film transistor TFT1 may include a p-type metal-oxide-semiconductor (pMOS) or an n-type metal-oxide semiconductor (nMOS) according to the kind of the first semiconductor layer 120*a*. For example, the first thin-film transistor TFT1 may include at least one of a driving thin-film transistor T1 (e.g., see FIGS. 4, 5, and 6), a switching thin-film transistor T2, a first emission control thin-film transistor T5, a second emission control thin-film transistor T6, or a bias thin-film transistor T7.

A second thin-film transistor TFT2 may include the second semiconductor layer 120*b* described above. The second semiconductor layer 120*b* of the second thin-film transistor TFT2 may include an oxide semiconductor, and according to the characteristic of the oxide semiconductor, the second thin-film transistor TFT2 may include an nMOS. For example, the second thin-film transistor TFT2 may include at least one of a compensation thin-film transistor T3 (e.g., see FIG. 4) or an initialization thin-film transistor T4. In some embodiments, the second semiconductor layer 120*b* may include LTPS (e.g., refer to the pixel circuit of FIG. 6).

Figure 4:
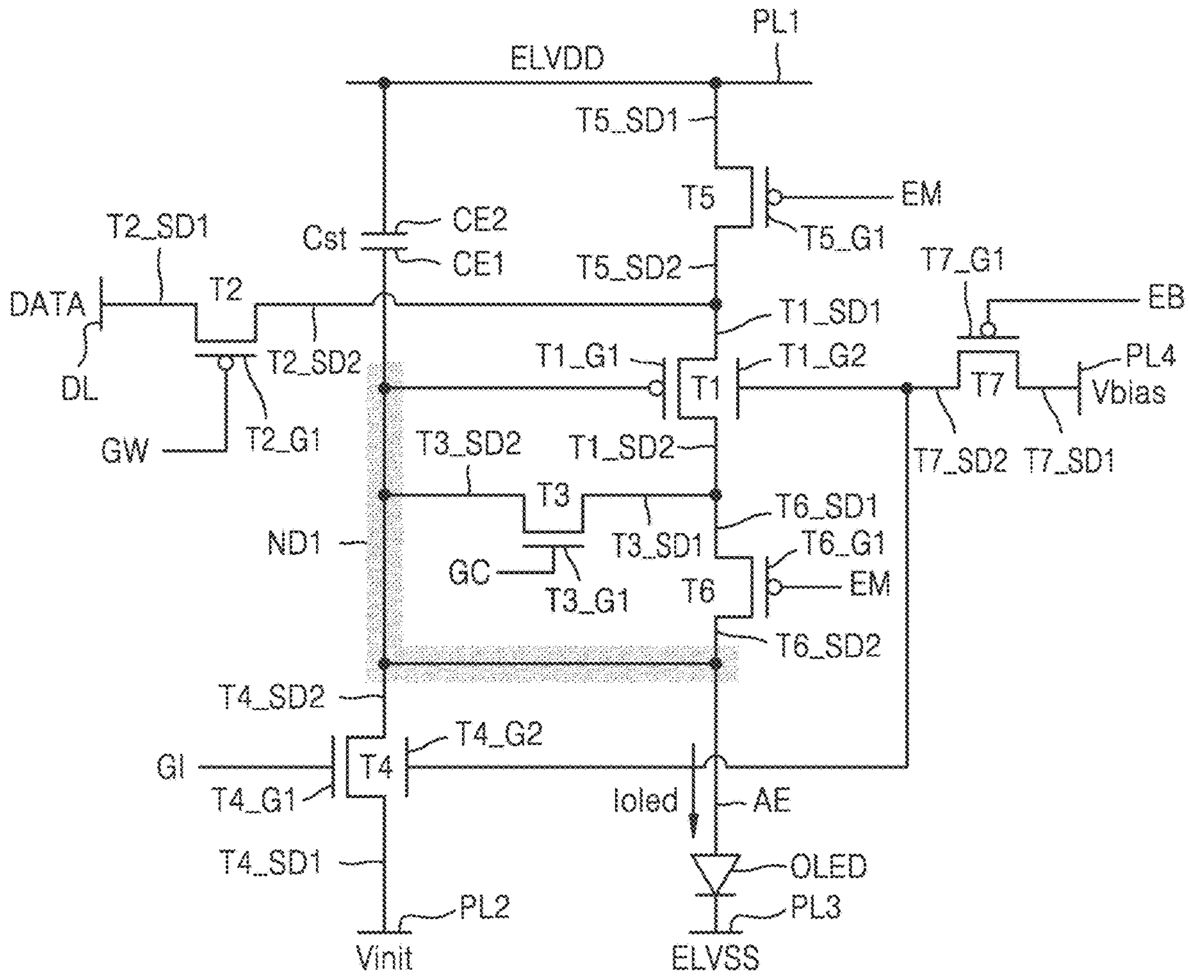
FIG. 4 is a schematic equivalent circuit diagram of an example of a pixel circuit of the display panel of FIG. 1.

FIG. 4 is a schematic equivalent circuit diagram of an example of a pixel circuit of the display panel 10 of FIG. 1.

As illustrated in FIG. 4, the pixel circuit may include a plurality of thin-film transistors, a storage capacitor Cst, an organic light-emitting diode OLED, and various lines.

For example, the pixel circuit may have a 7T1C (e.g., seven transistor-one capacitor) structure including seven thin-film transistors and one capacitor. The seven thin-film transistors may receive a control signal from the gate driving portion GP of FIG. 1, and may be turned on or turned off according to the control signal.

The pixel circuit may include the driving thin-film transistor T1. The driving thin-film transistor T1 may receive a data signal DATA, and may transmit a driving current loled (e.g., which may be interchangeably represented as $I_{DS}$ in FIGS. 9, 10, and the like) to the organic light-emitting diode OLED based on the data signal DATA. For example, the driving thin-film transistor T1 may have a dual-gate structure having two gate electrodes. For example, the driving thin-film transistor T1 may include a pMOS thin-film transistor and an LTPS thin-film transistor.

The driving thin-film transistor T1 may include a 1a gate electrode T1_G1, a 1b gate electrode T1_G2, a 1a source-drain electrode T1_SD1, and a 1b source-drain electrode T1_SD2. In a cross-sectional view, the first semiconductor layer 120*a* (e.g., see FIG. 3) may be disposed between the 1a gate electrode T1_G1 and the 1b gate electrode T1_G2, and the first semiconductor layer 120*a* may include, for example, LTPS. In a cross-sectional view, the 1a gate electrode T1_G1 may be disposed above the 1b gate electrode T1_G2. For example, the 1a gate electrode T1_G1 may perform a function of an upper gate in the dual-gate structure, and the 1b gate electrode T1_G2 may perform a function of a lower gate in the dual-gate structure.

For example, in the 7T1C structure, the driving thin-film transistor T1 may be electrically connected to the storage capacitor Cst, the switching thin-film transistor T2, the first emission control thin-film transistor T5, the second emission control thin-film transistor T6, the bias thin-film transistor T7, the compensation thin-film transistor T3, and the initialization thin-film transistor T4.

The 1a gate electrode T1_G1 may be electrically connected to the storage capacitor Cst. The 1a gate electrode T1_G1 may be electrically connected to a first electrode CE1 of the storage capacitor Cst. The 1a gate electrode T1_G1 may be electrically connected to a first node ND1 described in more detail below. The 1a gate electrode T1_G1 may be electrically connected to the compensation thin-film transistor T3 and the initialization thin-film transistor T4 described in more detail below. For example, an initialization voltage Vinit may be transmitted to the 1a gate electrode T1_G1 according to an on/off operation of the initialization thin-film transistor T4.

The 1b gate electrode T1_G2 may be electrically connected to the bias thin-film transistor T7 described in more detail below. Thus, a bias voltage Vbias may be transmitted to the 1b gate electrode T1_G2 according to an on/off operation of the bias thin-film transistor T7. For example, when the driving thin-film transistor T1 is a pMOS thin-film transistor, the bias voltage Vbias may have a positive magnitude.

The 1a source-drain electrode T1_SD1 may be electrically connected to a power voltage line PL1 configured to transmit a power voltage ELVDD. In some embodiments, the first emission control thin-film transistor T5 described in more detail below may be electrically connected between the 1a source-drain electrode T1_SD1 and a power line (e.g., the power voltage line PL1). For example, the power voltage ELVDD may be transmitted to the 1a source-drain electrode T1_SD1 according to an on/off operation of the first emission control thin-film transistor T5.

The 1a source-drain electrode T1_SD1 may receive the data signal DATA through the switching thin-film transistor T2. For example, the data signal DATA may be transmitted to the 1a source-drain electrode T1_SD1 according to an on/off operation of the switching thin-film transistor T2.

The 1b source-drain electrode T1_SD2 may transmit the driving current loled to the organic light-emitting diode OLED through the second emission control thin-film transistor T6. For example, the driving current loled may be transmitted to the organic light-emitting diode OLED according to an on/off operation of the second emission control thin-film transistor T6.

The storage capacitor Cst may include the first electrode CE1 electrically connected to the 1a gate electrode T1_G1, and a second electrode CE2 electrically connected to the power line (e.g., the power voltage line PL1). The first electrode CE1 may be electrically connected to the first node ND1. The first node ND1 may be electrically connected to the 1a gate electrode T1_G1 of the driving thin-film transistor T1, a 3b source-drain electrode T3_SD2 of the compensation thin-film transistor T3, a 4b source-drain electrode T4_SD2 of the initialization thin-film transistor T4, a 6b source-drain electrode T6_SD2 of the second emission control thin-film transistor T6, and the organic light-emitting diode OLED. Thus, the expression "being electrically connected to the first node ND1" may denote being electrically connected to at least one of the other components electrically connected to the first node ND1.

The second electrode CE2 of the storage capacitor Cst may be electrically connected to the power voltage line PL1 configured to transmit the power voltage ELVDD. The power voltage line PL1 may be electrically connected to a 5a source-drain electrode T5_SD1 of the first emission control thin-film transistor T5 described in more detail below.

The switching thin-film transistor T2 may transmit the data signal DATA to the driving thin-film transistor T1. As such, a 2a gate electrode T2_G1 of the switching thin-film transistor T2 may receive a data control signal GW from the gate driving portion GP described above with reference to FIG. 1. A 2a source-drain electrode T2_SD1 of the switching thin-film transistor T2 may be electrically connected to a data line DL configured to transmit the data signal DATA. A 2b source-drain electrode T2_SD2 of the switching thin-film transistor T2 may be electrically connected to the driving thin-film transistor T1. The 2b source-drain electrode T2_SD2 of the switching thin-film transistor T2 may be electrically connected to the 1a source-drain electrode T1_SD1 of the driving thin-film transistor T1. The 2a source-drain electrode T2_SD1 and the 2b source-drain electrode T2_SD2 may be formed on the first semiconductor layer 120*a*, and the first semiconductor layer 120*a* may include, for example, LTPS. For example, the data signal DATA may be transmitted to the driving thin-film transistor T1 according to an on/off operation of the switching thin-film transistor T2.

The compensation thin-film transistor T3 may be used for a compensation operation of a threshold voltage of the driving thin-film transistor T1. A 3a source-drain electrode T3_SD1 of the compensation thin-film transistor T3 may be electrically connected to the 1b source-drain electrode T1_SD2 of the driving thin-film transistor T1, and the 3b source-drain electrode T3_SD2 of the compensation thin-film transistor T3 may be electrically connected to the first node ND1. A 3a gate electrode T3_G1 of the compensation thin-film transistor T3 may receive a compensation control signal from the gate driving portion GP described above with reference to FIG. 1. The compensation thin-film transistor T3 may be turned on or turned off based on the compensation control signal GC, and the on/off operation of the compensation thin-film transistor T3 may be used for the compensation operation of the threshold voltage of the driving thin-film transistor T1. The 3a source-drain electrode T3_SD1 and the 3b source-drain electrode T3_SD2 may be formed on the second semiconductor layer 120*b* (e.g., also see FIG. 3), and the second semiconductor layer 120*b* may include, for example, an oxide semiconductor.

The initialization thin-film transistor T4 may include a 4a gate electrode T4_G1, a 4b gate electrode T4_G2, the 4a source-drain electrode T4_SD1, and a 4b source-drain electrode T4_SD2. In a cross-sectional view, the second semiconductor layer 120*b* may be disposed between the 4a gate electrode T4_G1 and the 4b gate electrode T4_G2, and the second semiconductor layer 120*b* may include, for example, an oxide semiconductor. In the cross-sectional view, the 4a gate electrode T4_G1 may be disposed above the 4b gate electrode T4_G2. For example, the 4a gate electrode T4_G1 may perform a function of an upper gate in the dual-gate structure, and the 4b gate electrode T4_G2 may perform a function of a lower gate in the dual-gate structure.

The initialization thin-film transistor T4 may transmit the initialization voltage Vinit to the storage capacitor Cst. The 4a source-drain electrode T4_SD1 of the initialization thin-film transistor T4 may be electrically connected to an initialization voltage line PL2 configured to transmit the initialization voltage Vinit. The 4b source-drain electrode T4_SD2 of the initialization thin-film transistor T4 may be electrically connected to the first node ND1. The 4a source-drain electrode T4_SD1 and the 4b source-drain electrode T4_SD2 may be formed on the second semiconductor layer 120*b*, and the second semiconductor layer 120*b* may include, for example, an oxide semiconductor.

The 4a gate electrode T4_G1 of the initialization thin-film transistor T4 may receive an initialization control signal GI from the gate driving portion GP described above with reference to FIG. 1. The initialization thin-film transistor T4 may be turned on or turned off based on the initialization control signal GI, and the initialization voltage Vinit may be transmitted to the storage capacitor Cst according to the on/off operation of the initialization thin-film transistor T4.

The 4b gate electrode T4_G2 of the initialization thin-film transistor T4 may be electrically connected to the bias thin-film transistor T7 described in more detail below. Thus, the bias voltage Vbias may be transmitted to the 4b gate electrode T4_G2 according to an on/off operation of the bias thin-film transistor T7.

A 5a source-drain electrode T5_SD1 of the first emission control thin-film transistor T5 may be electrically connected to the power voltage line PL1 configured to transmit the power voltage ELVDD. A 5b source-drain electrode T5_SD2 of the first emission control thin-film transistor T5 may be electrically connected to the 1a source-drain electrode T1_SD1 of the driving thin-film transistor T1. The 5b source-drain electrode T5_SD2 of the first emission control thin-film transistor T5 may be electrically connected to the 2b source-drain electrode T2_SD2 of the switching thin-film transistor T2. A 5a gate electrode T5_G1 of the first emission control thin-film transistor T5 may receive an emission control signal EM from the gate driving portion GP described above with reference to FIG. 1. The first emission control thin-film transistor T5 may be turned on or turned off based on the emission control signal EM, and the power voltage ELVDD may be transmitted to the driving thin-film transistor T1 according to the on/off operation of the first emission control thin-film transistor T5.

The second emission control thin-film transistor T6 may include a 6a source-drain electrode T6_SD1, the 6b source-drain electrode T6_SD2, and a 6a gate electrode T6_G1. The 6a source-drain electrode T6_SD1 may be electrically connected to the 1b source-drain electrode T1_SD2 of the driving thin-film transistor T1. The 6a source-drain electrode T6_SD1 may be electrically connected to the 3a source-drain electrode T3_SD1 of the compensation thin-film transistor T3. The 6b source-drain electrode T6_SD2 may be electrically connected to the organic light-emitting diode OLED. The 6b source-drain electrode T6_SD2 may be electrically connected to the first node ND1. The 6a source-drain electrode T6_SD1 and the 6b source-drain electrode T6_SD2 may be formed on the first semiconductor layer 120*a*, and the first semiconductor layer 120*a* may include, for example, LTPS.

The 6a gate electrode T6_G1 of the second emission control thin-film transistor T6 may receive an emission control signal EM from the gate driving portion GP described above with reference to FIG. 1. For example, the emission control signal EM transmitted to the 6a gate electrode T6_G1 may be the same as the control signal transmitted to the first emission control thin-film transistor T5. The second emission control thin-film transistor T6 may be turned on or turned off based on the emission control signal EM, and the driving current Ioled may be transmitted to the organic light-emitting diode OLED according to the on/off operation of the second emission control thin-film transistor T6.

The bias thin-film transistor T7 may include a 7a source-drain electrode T7_SD1, a 7b source-drain electrode T7_SD2, and a 7a gate electrode T7_G1. The 7b source-drain electrode T7_SD2 may be electrically connected to the 1b gate electrode T1_G2 of the driving thin-film transistor T1. The 7a source-drain electrode T7_SD1 may be electrically connected to a bias voltage line PL4 configured to transmit the bias voltage Vbias. The 7a source-drain electrode T7_SD1 and the 7b source-drain electrode T7_SD2 may be formed on the first semiconductor layer 120*a*, and the first semiconductor layer 120*a* may include, for example, LTPS.

The 7a gate electrode T7_G1 may receive a bias control signal EB from the gate driving portion GP described above with reference to FIG. 1. The bias thin-film transistor T7 may be turned on or turned off based on the bias control signal EB, and the bias voltage Vbias may be transmitted to the 1b gate electrode T1_G2 of the driving thin-film transistor T1 according to the on/off operation of the bias thin-film transistor T7.

The organic light-emitting diode OLED may be connected (e.g., may be directly connected) to the first node ND1 and the second emission control thin-film transistor T6. The organic light-emitting diode OLED may include an anode AE, and the anode AE may be connected (e.g., may be directly or electrically connected) to the second emission control thin-film transistor T6. It may be understood that the anode AE may be electrically connected to other elements of the pixel circuit through the first node ND1 and the second emission control thin-film transistor T6. The anode AE may be electrically connected to the driving thin-film transistor T1 (e.g., through the first node ND1 or the second emission control thin-film transistor T6). The organic light-emitting diode OLED may be electrically connected to a second power voltage line PL3 configured to transmit a second power voltage ELVSS. In more detail, the organic light-emitting diode OLED may further include a cathode, and the cathode may be electrically connected to the second power voltage line PL3. For example, in the cross-sectional view, an organic material layer that emits light when a current flows may be disposed between the anode AE and the cathode.

The pixel circuit according to an embodiment may include the driving thin-film transistor T1, the storage capacitor Cst, the bias thin-film transistor T7, and the organic light-emitting diode OLED. The driving thin-film transistor T1 may include the 1a gate electrode T1_G1, the 1b gate electrode T1_G2, and the first semiconductor layer 120*a* disposed, in a cross-sectional view, between the 1a gate electrode T1_G1 and the 1b gate electrode T1_G2. The storage capacitor Cst may include the first electrode CE1 electrically connected to the 1a gate electrode T1_G1, and the second electrode CE2 spaced apart from the first electrode CE1. The bias thin-film transistor T7 may include the 7b source-drain electrode T7_SD2 electrically connected to the 1b gate electrode T1_G2, and the 7a source-drain electrode T7_SD1 for receiving the bias voltage Vbias. The organic light-emitting diode OLED may include the anode AE electrically connected to the driving thin-film transistor T1. The 7a source-drain electrode T7_SD1 of the bias thin-film transistor T7 may be electrically connected to the bias voltage line PL4 configured to transmit the bias voltage Vbias.

According to an embodiment, when the bias thin-film transistor T7 is turned on, the bias voltage Vbias may be applied to the 1b gate electrode T1_G2.

According to an embodiment, the driving thin-film transistor T1 may have a threshold voltage, and when the bias voltage Vbias is applied to the 1b gate electrode T1_G2, the threshold voltage may be shifted by the bias voltage Vbias.

According to an embodiment, the driving thin-film transistor T1 may be a pMOS thin-film transistor, and the bias voltage Vbias may be a positive number (e.g., a positive voltage).

According to an embodiment, the initialization thin-film transistor T4 electrically connected to the first electrode CE1 may further be provided.

According to an embodiment, the initialization thin-film transistor T4 may include the second semiconductor layer 120*b* including an oxide semiconductor.

According to an embodiment, the 4b source-drain electrode T4_SD2 of the initialization thin-film transistor T4 may be electrically connected to the anode AE of the organic light-emitting diode OLED.

According to an embodiment, the 4b source-drain electrode T4_SD2 may be electrically connected to the first electrode CE1.

According to an embodiment, the 4a source-drain electrode T4_SD1 of the initialization thin-film transistor T4 may be electrically connected to the initialization voltage line PL2 configured to transmit the initialization voltage Vinit.

According to an embodiment, the initialization thin-film transistor T4 may include the 4a gate electrode T4_G1, the 4b gate electrode T4_G2, and the second semiconductor layer 120*b* disposed, in the cross-sectional view, between the 4a gate electrode T4_G1 and the 4b gate electrode T4_G2.

According to an embodiment, the 7b source-drain electrode T7_2 may be electrically connected to the 4b gate electrode T4_G2.

According to an embodiment, when the bias thin-film transistor T7 is turned on, the bias voltage Vbias may be applied to the 1b gate electrode T1_G2 and the 4b gate electrode T4_G2.

According to an embodiment, when the initialization thin-film transistor T4 is turned on according to the bias voltage Vbias, the anode AE may be initialized.

According to an embodiment, the initialization thin-film transistor T4 may include an NMOS thin-film transistor.

According to an embodiment, the initialization thin-film transistor T4 may include a PMOS thin-film transistor, the bias thin-film transistor T7 may be turned on or turned off according to the control signal, and the 4b gate electrode T4_G2 may be receive the control signal.

According to an embodiment, the second electrode CE2 may be electrically connected to the power line configured to transmit the power voltage ELVDD.

The pixel circuit according to an embodiment may further include the switching thin-film transistor T2 electrically connected to the 1a source-drain electrode T1_SD1 of the driving thin-film transistor T1, the first emission control thin-film transistor T5 electrically connecting the power line to the driving thin-film transistor T1, and the second emission control thin-film transistor T6 electrically connecting the anode AE to the driving thin-film transistor T1.

Figure 5:
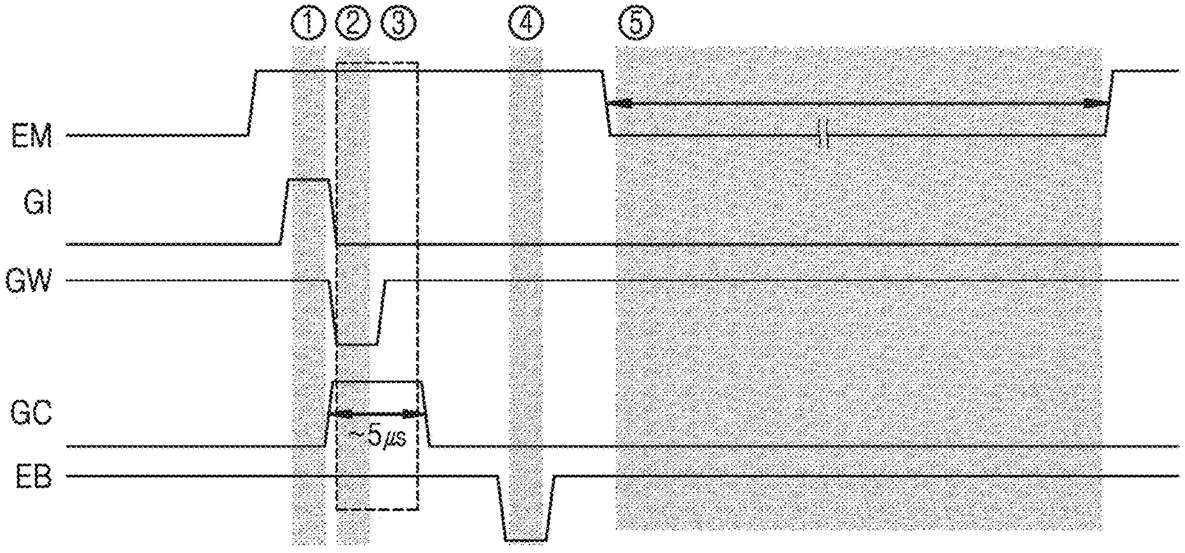
FIG. 5 is a timing diagram of control signals respectively transmitted to thin-film transistors of the pixel circuit of FIG. 4.

FIG. 5 is a timing diagram of control signals respectively transmitted to the thin-film transistors of the pixel circuit of FIG. 4.

As illustrated in FIG. 5, the emission control signal EM, the initialization control signal GI, the data control signal GW, the compensation control signal GC, and the bias control signal EB may be applied to the pixel circuit. According to a type by which the control signal is applied, operations of driving the pixel circuit may be described. For example, for pMOS thin-film transistor, when the control signals of FIG. 5 rise, the control signals may be off signals, and when the control signals of FIG. 5 fall, the control signals may be on signals. And for NMOS thin-film transistor, when the control signals of FIG. 5 fall, the control signals may be off signals, and when the control signals of FIG. 5 rise, the control signals may be on signals. Hereinafter, other control signals than the control signal described in each operation may be the off signals.

In a first operation (e.g., section ① of FIG. 5), the initialization control signal GI may have an on level.

The first operation may be an operation in which the initialization control signal GI (e.g., only the initialization control signal GI) may have on level. The first operation may be for initializing the storage capacitor Cst. When the initialization control signal GI that rises is applied to the 4a gate electrode T4_G1 of the initialization thin-film transistor T4, the initialization thin-film transistor T4 may be turned on. When the initialization thin-film transistor T4 is turned on, the initialization voltage Vinit may be applied to the first electrode CE1 of the storage capacitor Cst, and thus, the storage capacitor Cst may be initialized.

In a second operation (e.g., section ② of FIG. 5), the data control signal GW and the compensation control signal GC may have on levels.

The second operation may be an operation in which the initialization control signal GI falls, and the data control signal GW falls and the compensation control signal GC rises. The second operation may be for writing a data signal DATA. When the data control signal GW that falls is applied to the 2a gate electrode T2_G1 of the switching thin-film transistor T2, the switching thin-film transistor T2 may be turned on. When the compensation control signal GC that rises is applied to the 3a gate electrode T3_G1 of the compensation thin-film transistor T3, the compensation thin-film transistor T3 and the driving thin-film transistor T1 may be turned on. When the switching thin-film transistor T2 and the driving thin-film transistor T1 are turned on, the data signal DATA may be applied to the driving thin-film transistor T1. When the data signal DATA is applied to the driving thin-film transistor T1, the magnitude of a current flowing through the driving thin-film transistor T1 may be changed based on the data signal DATA.

In a third operation (e.g., section ③ of FIG. 5), the compensation control signal GC may have an on level.

The third operation may be an operation in which the data control signal GW rises, and the compensation control signal GC is still in a falling state. The third operation may be an operation for compensating for a threshold voltage. For example, the third operation may proceed during a time period that is about 5 μs or less.

When the data control signal GW that rises is applied to the 2a gate electrode T2_G1 of the switching thin-film transistor T2, the switching thin-film transistor T2 may be turned off. The compensation control signal GC is still in the rising state, and thus, the compensation thin-film transistor T3 and the driving thin-film transistor T1 may be in a turned-on state. When the compensation thin-film transistor T3 and the driving thin-film transistor T1 are still in the turned-on state, a compensation voltage based on the data signal DATA may be applied to the first electrode CE1 of the storage capacitor Cst. For example, the compensation voltage (e.g., "Vdata-Vth", where Vdata indicates the data signal and Vth indicates the threshold voltage) having a magnitude obtained by subtracting a threshold voltage of the driving thin-film transistor T1 from the data signal DATA, may be applied to the first electrode CE1 of the storage capacitor Cst. The third operation may be an example of the compensation operation realized in the pixel circuit described above.

In a fourth operation (e.g., section ④ of FIG. 5), the bias control signal EB may have an on level.

The fourth operation may be an operation in which the compensation control signal GC falls, and the bias control signal EB falls. The fourth operation may be an on-biasing operation. For example, the fourth operation may be an operation (e.g., a threshold voltage initialization operation) in which the bias voltage Vbias is applied to the 1b gate electrode T1_G2 to shift the threshold voltage.

When the bias control signal EB that falls is applied to the 7a gate electrode T7_G1, which is the upper gate electrode of the bias thin-film transistor T7, the bias thin-film transistor T7 may be turned on. When the bias thin-film transistor T7 is turned on, the bias voltage Vbias applied to the 7a source-drain electrode T7_SD1 of the bias thin-film transistor T7 may be transmitted to the 7b source-drain electrode T7_SD2 of the bias thin-film transistor T7.

When the bias voltage Vbias is transmitted to the 7b source-drain electrode T7_SD2, the bias voltage Vbias may be transmitted to the 1b gate electrode T1_G2, which is the lower gate electrode of the driving thin-film transistor T1 electrically connected to the 7b source-drain electrode T7_SD2. When the bias voltage Vbias is applied to the 1b gate electrode T1_G2 of the driving thin-film transistor T1, the threshold voltage of the driving thin-film transistor T1 may be initialized based on the characteristic of a dual gate.

For example, there may be trapped holes between a semiconductor layer and a gate insulating layer included in the driving thin-film transistor T1 of a pMOS type. The threshold voltage of the driving thin-film transistor T1 may be changed due to the trapped holes. The driving current loled flowing through the driving thin-film transistor T1 may also be changed (e.g., may be distorted) due to the changed threshold voltage, and the changed driving current loled may generate adverse effects on a display quality. In other words, it may be desired to initialize the threshold voltage of the driving thin-film transistor T1 that is changed by the trapped holes.

In order to transmit the trapped holes to the source area, a positive voltage (e.g., +6V or higher) may be applied to the lower gate electrode in the dual gate structure. When the positive voltage is applied, at least a portion of the trapped holes may be removed, and the effect of the trapped holes on the threshold voltage of the driving thin-film transistor T1 may be reduced or removed. As a result, the changed threshold voltage may be initialized. As the threshold voltage is initialized, the change (e.g., the distortion) of the driving current loled that may be caused by the change of the threshold voltage may be reduced, and the reduction of the change or the distortion of the driving current loled may be a significant effect obtained by using the bias thin-film transistor T7.

In the pixel circuit of FIG. 4, the 7b source-drain electrode T7_SD2 of the bias thin-film transistor T7 may be electrically connected to the 4b gate electrode T4_G2, which is the lower gate electrode of the initialization thin-film transistor T4. When the bias thin-film transistor T7 is turned on, the bias voltage Vbias may be transmitted to the 4b gate electrode T4_G2 of the initialization thin-film transistor T4. When the bias voltage Vbias is transmitted to the 4b gate electrode T4_G2 of the initialization thin-film transistor T4, the initialization thin-film transistor T4 may be turned on. When the initialization thin-film transistor T4 is turned on, the initialization voltage Vinit may be transmitted to the first node ND1 or the anode AE electrically connected to the first node ND1. The anode AE may be initialized by the initialization voltage Vinit. The initialization of the anode AE may denote the extinction of the hole or charges remaining in the anode AE by the initialization voltage Vinit.

For example, the initialization thin-film transistor T4 may be an nMOS type. When the initialization thin-film transistor T4 is an nMOS type, it may be desired to apply a positive voltage to the 4b gate electrode T4_G2, which is the lower gate electrode of the initialization thin-film transistor T4, in order to turn on the initialization thin-film transistor T4. Because the bias voltage Vbias is a positive voltage (e.g., 6V or higher), when the bias voltage Vbias is applied to the 4b gate electrode T4_G2, the initialization thin-film transistor T4 may be turned on.

Thus, the pixel circuit of FIG. 4 may perform the initialization of the threshold voltage of the driving thin-film transistor T1 and the initialization of the anode AE included in the organic light-emitting diode OLED, by using the operation of (e.g., by using only the operation of) the turning on of the bias thin-film transistor T7.

In a fifth operation (e.g., section ⑤ of FIG. 5), the emission control signal EM may have an on level.

The fifth operation may be an operation in which the bias control signal EB rises, and the emission control signal EM falls. The fifth operation may be an emission operation. For example, the fifth operation may include an operation of applying a driving voltage (e.g., the power voltage ELVDD or the voltage difference between the power voltage ELVDD and the second power voltage ELVSS) to the driving thin-film transistor T1, and may be an operation of transmitting the driving current Ioled to the organic light-emitting diode OLED based on the shifted threshold voltage and the driving voltage described above.

The emission control signal EM that falls may be applied to the 5a gate electrode T5_G1 of the first emission control thin-film transistor T5 and the 6a gate electrode T6_G1 of the second emission control thin-film transistor T6. When the emission control signal EM that falls is applied to the 5a gate electrode T5_G1 and the 6a gate electrode T6_G1, the first emission control thin-film transistor T5 and the second emission control thin-film transistor T6 may be turned on. When the first emission control thin-film transistor T5 and the second emission control thin-film transistor T6 are turned on, the power voltage ELVDD may be applied to the driving thin-film transistor T1. Thus, the driving current Ioled generated by the power voltage ELVDD may flow through the driving thin-film transistor T1, and the driving current Ioled may be transmitted to the organic light-emitting diode OLED. The organic light-emitting diode OLED may emit light through the driving current Ioled.

A method of driving the pixel circuit, according to an embodiment, may include the first to fifth operations described above.

The method of driving the pixel circuit may be provided, according to an embodiment. The pixel circuit may include the plurality of thin-film transistors including the driving thin-film transistor T1, the storage capacitor Cst including the first electrode CE1 and the second electrode CE2, and the organic light-emitting diode OLED including the anode AE and for emitting light by receiving the driving current Ioled from the driving thin-film transistor T1. The driving thin-film transistor T1 may include the 1a gate electrode T1_G1 and the 1b gate electrode T1_G2 disposed below the 1a gate electrode T1_G1.

The method of driving the pixel circuit, according to an embodiment, may include shifting the threshold voltage of the driving thin-film transistor T1 by applying the bias voltage Vbias to the 1b gate electrode T1_G2, applying the driving voltage to the driving thin-film transistor T1, and transmitting the driving current Ioled to the organic light-emitting diode OLED based on the shifted threshold voltage and the driving voltage.

According to an embodiment, the plurality of thin-film transistors may further include the initialization thin-film transistor T4 electrically connected to the anode AE. The initialization thin-film transistor T4 may be an nMOS thin-film transistor and may include the 4a gate electrode T4_G1 and the 4b gate electrode T4_G2 disposed below the 4a gate electrode T4_G1. The shifting of the threshold voltage may include initializing the anode AE by applying the bias voltage Vbias simultaneously to the 1b gate electrode T1_G2 and the 4b gate electrode T4_G2.

Figure 6A:
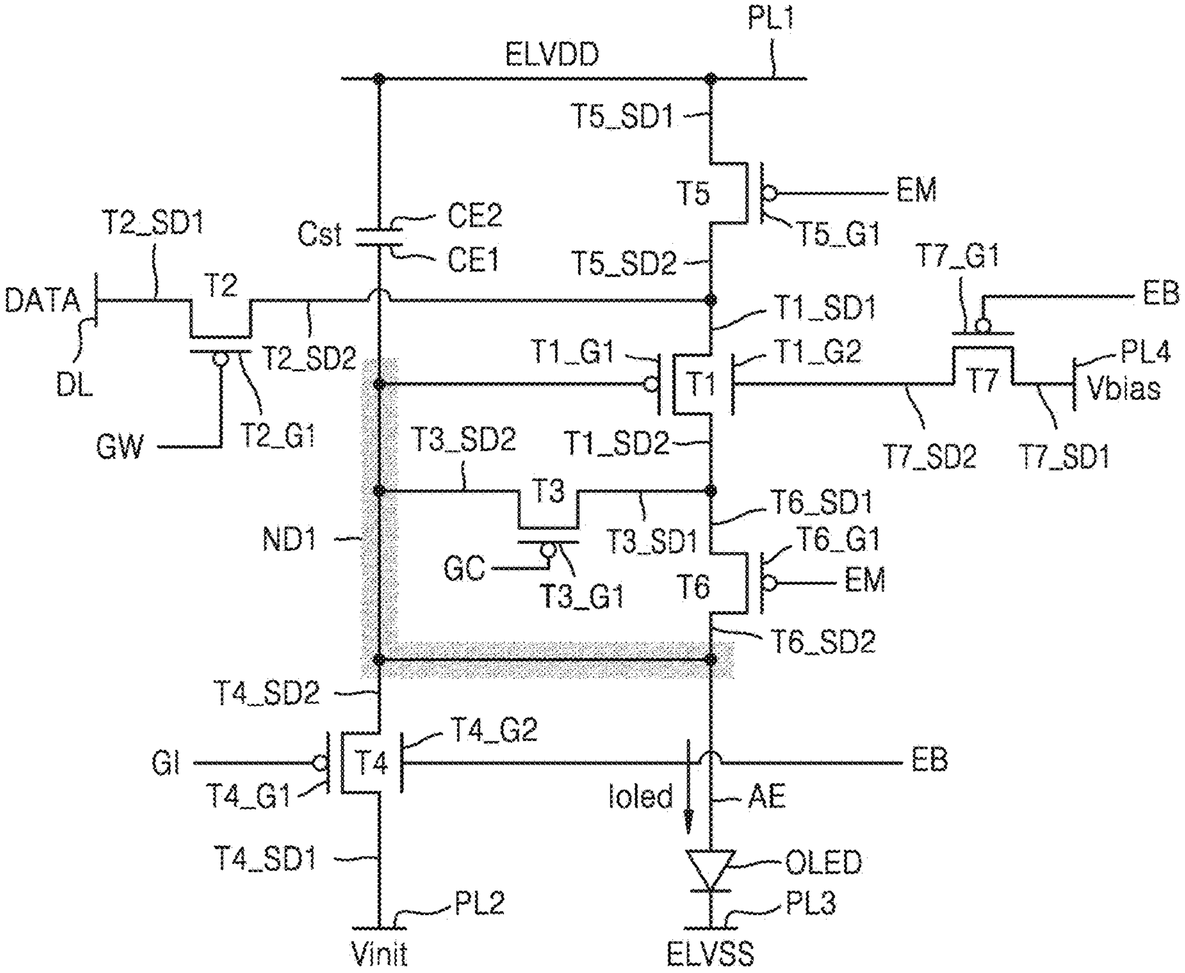
FIG. 6A is a schematic equivalent circuit diagram of an example of a pixel circuit of the display panel of FIG. 1.

FIG. 6A is a schematic equivalent circuit diagram of an example of a pixel circuit of the display panel 10 of FIG. 1.

Hereinafter with reference to FIG. 6A, redundant description of the aspects and features that are the same or substantially the same as those described above may not be repeated. For example, control signals for driving the pixel circuit illustrated in FIG. 6 may be provided to the thin-film transistors the same or substantially the same as those described above with reference to the timing diagram of FIG. 5.

As illustrated in FIG. 6A, the initialization thin-film transistor T4 may be a pMOS type. When the initialization thin-film transistor T4 is a pMOS type, the voltage applied to the 4b gate electrode T4_G2, which is the lower gate electrode, may fall, or the voltage applied to the 4b gate electrode T4_G2 may be a negative voltage, in order to turn on the initialization thin-film transistor T4.

The bias control signal EB may fall in order to turn on the bias thin-film transistor T7, and thus, the bias control signal EB may be applied to the 4b gate electrode T4_G2, which is the lower gate electrode of the initialization thin-film transistor T4. Thus, when the bias control signal EB falls, the bias thin-film transistor T7 and the initialization thin-film transistor T4 may be turned on. For example, the bias control signal EB that falls may have a negative voltage.

The initialization thin-film transistor T4 and the compensation thin-film transistor T3 illustrated in FIG. 6A may be the pMOS type, unlike the initialization thin-film transistor T4 and the compensation thin-film transistor T3 described above with reference to FIG. 4. The semiconductor layer included in each of the initialization thin-film transistor T4 and the compensation thin-film transistor T3 illustrated in FIG. 6A may not include an oxide semiconductor.

Figure 6B:
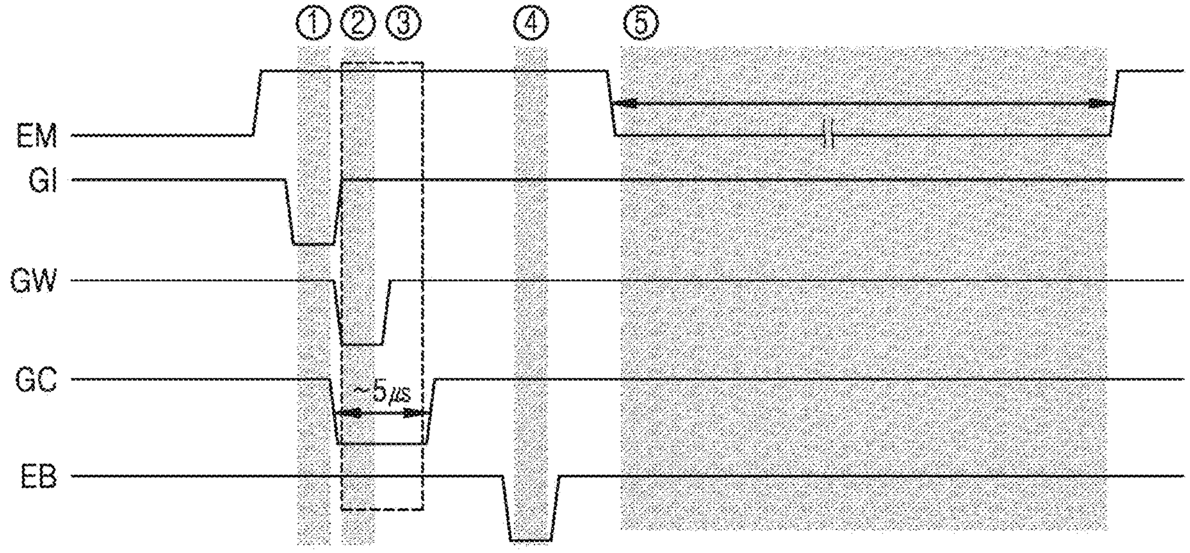
FIG. 6B is a timing diagram of control signals respectively transmitted to thin-film transistors of a pixel circuit of FIG. 6.

According to an embodiment, referring to FIGS. 6A and 6B, the plurality of thin-film transistors may further include the initialization thin-film transistor T4 electrically connected to the anode AE, and the bias thin-film transistor T7 electrically connected to the 1b gate electrode T1_G2. The initialization thin-film transistor T4 may be the pMOS thin-film transistor, and may include the 4a gate electrode T4_G1 and the 4b gate electrode T4_G2 disposed below the 4a gate electrode T4_G1. The bias thin-film transistor T7 may be turned on or turned off according to the control signal (e.g., the bias control signal EB) received from the gate driving portion GP described above with reference to FIG. 1. The shifting of the threshold voltage may include initializing the anode AE by applying the control signal to the 4b gate electrode T4_G2.

Figure 7:
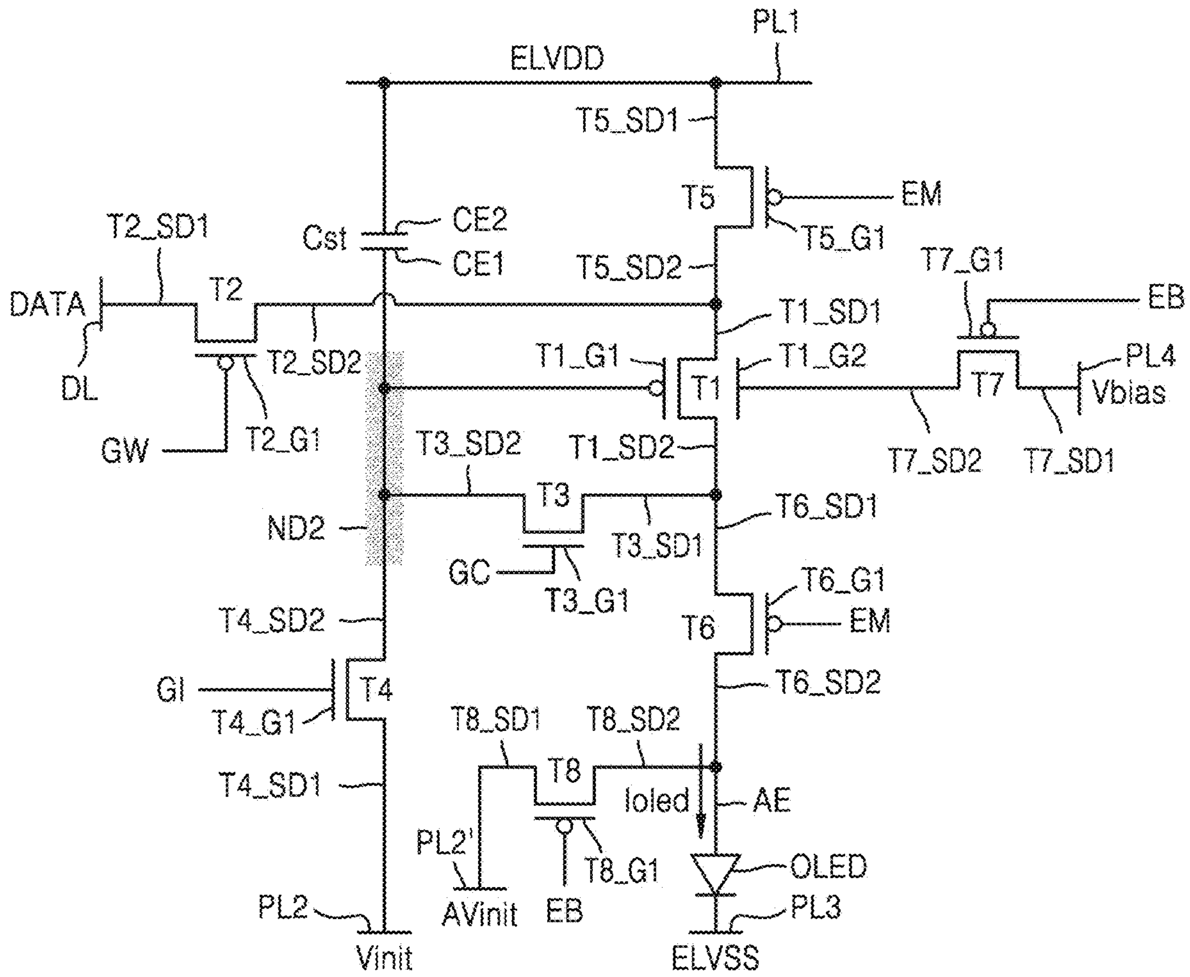
FIG. 7 is a schematic equivalent circuit diagram of an example of a pixel circuit of the display panel of FIG. 1.

FIG. 7 is a schematic equivalent circuit diagram of an example of a pixel circuit of the display panel 10 of FIG. 1.

Hereinafter with reference to FIG. 7, redundant description of the aspects and features that are the same or substantially the same as those described above may not be repeated. For example, control signals for driving the pixel circuit illustrated in FIG. 7 may be provided to the thin-film transistors the same or substantially the same as those described above with reference to the timing diagram of FIG. 5.

As illustrated in FIG. 7, the pixel circuit of FIG. 7 may have an 8T1C (e.g., an eight transistor-one capacitor) structure. The pixel circuit of FIG. 7 may further include a second initialization thin-film transistor T8. Because the pixel circuit of FIG. 7 may further include the second initialization thin-film transistor T8, the first node ND1 described above with reference to FIGS. 4 and 6A may be changed to a second node ND2 in FIG. 7. Unlike the first node ND1 described above with reference to FIGS. 4 and 6A, the second node ND2 may not be directly connected to the anode AE included in the organic light-emitting diode OLED. The compensation thin-film transistor T3 may be disposed between the second node ND2 and the anode AE, and by the on/off operation of the compensation thin-film transistor T3 and the second emission control thin-film transistor T6, the second node ND2 may or may not be electrically connected to the anode AE.

The initialization thin-film transistor T4 illustrated in FIG. 7 may be electrically connected to the second node ND2, and unlike the pixel circuits described above with reference to FIGS. 4 and 6A, the initialization thin-film transistor T4 may not be directly connected to the anode AE.

The second initialization thin-film transistor T8 may include an 8a source-drain electrode T8_SD1, an 8b source-drain electrode T8_SD2, and an 8a gate electrode T8_G1. For example, the second initialization thin-film transistor T8 may be a pMOS type.

The bias control signal EBmay be applied to the 8a gate electrode T8_G1 of the second initialization thin-film transistor T8. For example, the bias control signal EBapplied to the 8a gate electrode T8_G1 may be the same signal as the control signal applied to the 7a gate electrode T7_G1.

As the bias control signal EB falls, the second initialization thin-film transistor T8 may be turned on. When the second initialization thin-film transistor T8 is turned on, a second initialization voltage AVinit may be applied to the anode AE. The second initialization voltage AVinit may be applied to the 8a source-drain electrode T8_SD1, and the 8a source-drain electrode T8_SD1 may be electrically connected to a second initialization voltage line PL2' configured to transmit the second initialization voltage AVinit.

The anode AE may be initialized by the second initialization voltage AVinit. The initialization of the anode AE by the second initialization voltage AVinit may be realized in the fourth operation in which the bias control signal EB has the on level.

Figure 8:
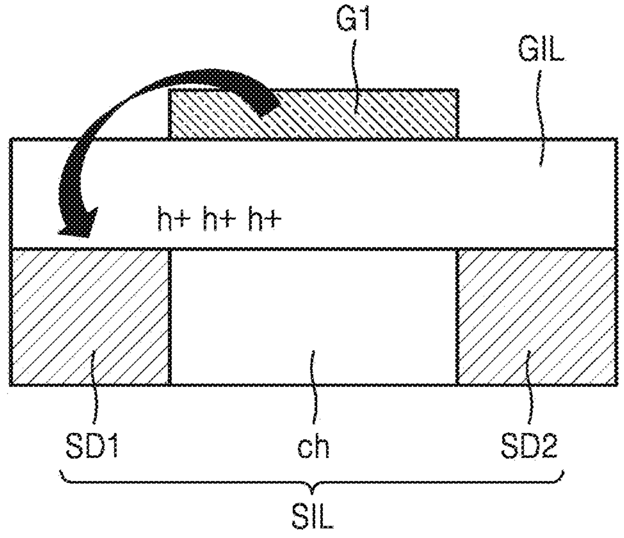
FIG. 8 is a schematic cross-sectional view illustrating a hysteresis phenomenon occurring in a thin-film transistor.
Figure 9:
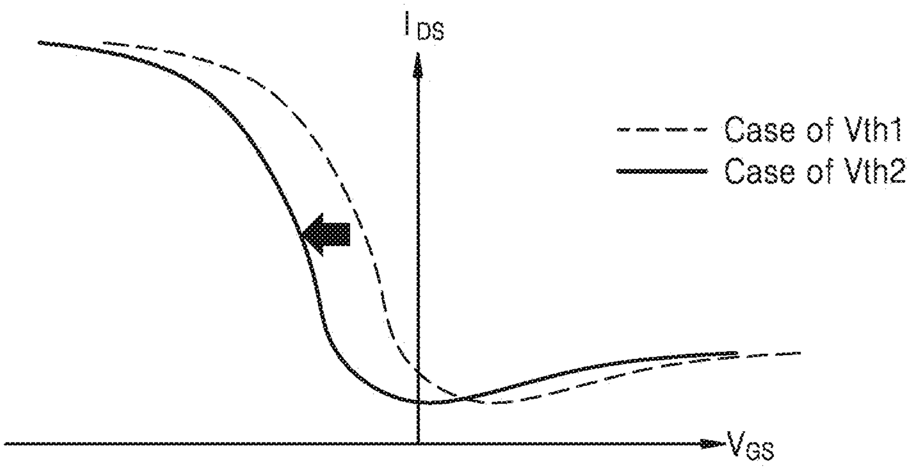
FIG. 9 is a schematic graph illustrating a threshold voltage change phenomenon occurring in a thin-film transistor.
Figure 10:
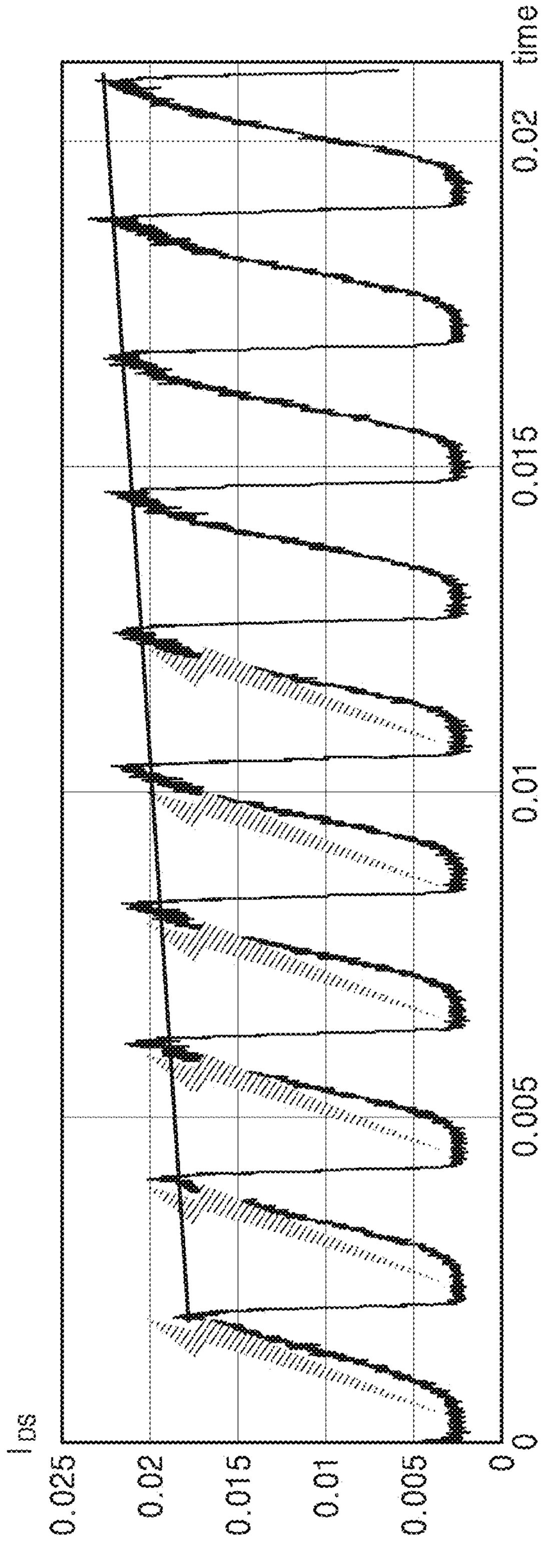
FIG. 10 is a schematic graph illustrating an effect that a hysteresis phenomenon occurring in a driving thin-film transistor of a pixel circuit has on a display quality.

FIG. 8 is a schematic cross-sectional view illustrating a hysteresis phenomenon occurring in a thin-film transistor. FIG. 9 is a schematic graph illustrating a threshold voltage change occurring in a thin-film transistor. FIG. 10 is a schematic graph illustrating an effect that the hysteresis phenomenon occurring in a driving thin-film transistor of a pixel circuit has on a display quality.

As illustrated in FIG. 8, the thin-film transistor may include a semiconductor layer SIL, a gate layer G1 disposed above the semiconductor layer SIL, and an (inorganic) insulating layer GIL disposed between the semiconductor layer SIL and the gate layer G1. The semiconductor layer SIL may include a source area SD1, a drain area SD2, and a channel area ch. For example, the pMOS-type thin-film transistor may be driven by a source-gate voltage applied between the source area SD1 and the gate layer G1. In this case, holes may be trapped at a boundary surface between the insulating layer GIL and the semiconductor layer SIL. When the holes are trapped at the boundary surface, a characteristic of the thin-film transistor may be changed, which may be referred to as a hysteresis phenomenon.

As illustrated in FIG. 9, a first threshold voltage Vth1 may be a threshold voltage of a thin-film transistor having a dual-gate structure in an initial state. A second threshold voltage Vth2 may be a threshold voltage that is shifted by the trapped holes as time passes. The second threshold voltage Vth2 may be a threshold voltage that is shifted from the first threshold voltage Vth1 in a negative direction by the trapped holes.

Referring to FIG. 9, a $V_{GS}$-$I_{DS}$ curve in the case of the second threshold voltage Vth2 is shifted to the left side compared to a $V_{GS}$-$I_{DS}$ curve in the case of the first threshold voltage Vth1. The $V_{GS}$-$I_{DS}$ curve of the thin-film transistor is shifted to the left side (e.g., a negative shift phenomenon) due to the trapped holes.

When the threshold voltage is changed, a characteristic of the thin-film transistor may be changed by the changed threshold voltage. For example, a current value passing through the thin-film transistor may be changed.

As illustrated in FIG. 10, as time passes, the number of trapped holes may increase. In this case, when the number of trapped holes increases, the amount of change of the threshold voltage of the driving thin-film transistor T1 (e.g., see FIGS. 4, 6, and 7) may further increase. As the amount of change of the threshold voltage of the driving thin-film transistor T1 further increases, the magnitude of the driving current $I_{DS}$ passing through the driving thin-film transistor T1 may be changed. When the magnitude of the driving current IDs is changed, the brightness of the organic light-emitting diode OLED through which the driving current $I_{DS}$ flows may be changed, which may deteriorate the display quality. For example, as the threshold voltage is negative shifted, a size of the peak value of the driving current Ios may gradually increase as shown in FIG. 10.

Figure 11:
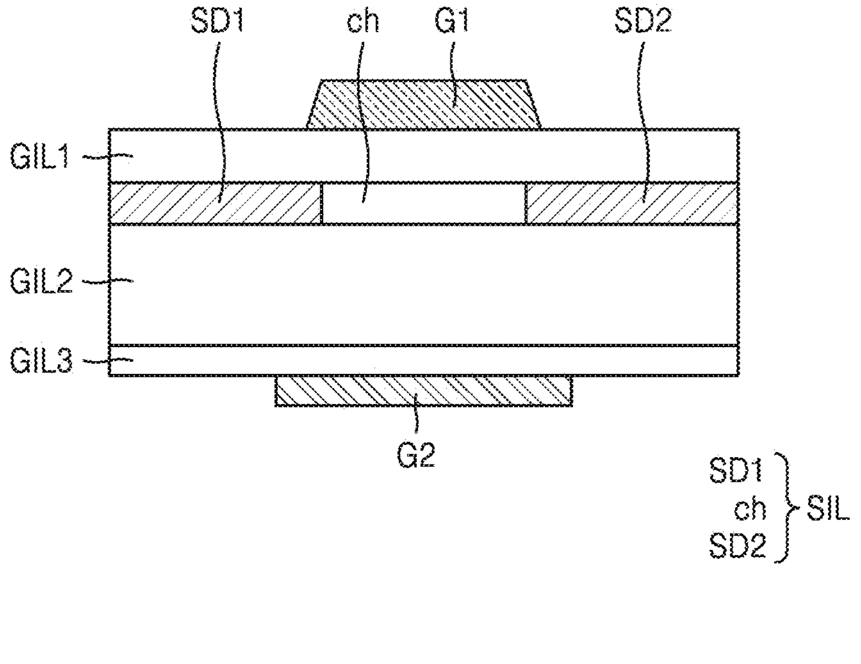
FIG. 11 is a schematic cross-sectional view of an example of a thin-film transistor having a dual-gate structure.
Figure 12:
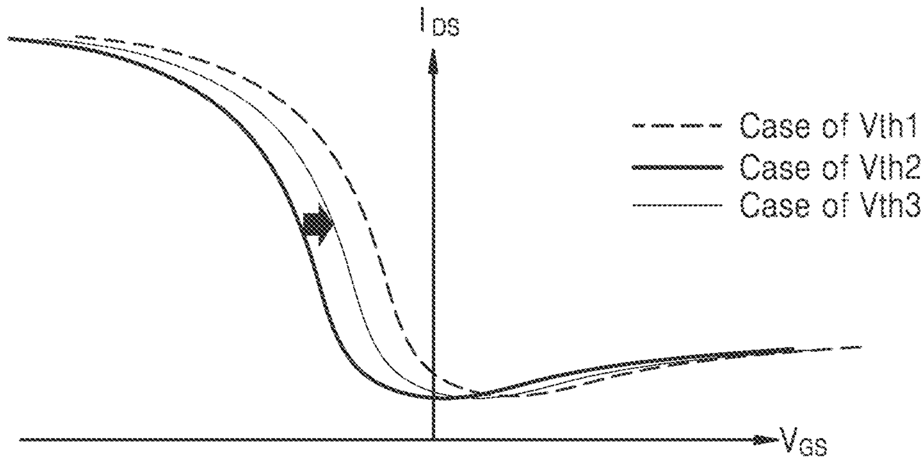
FIG. 12 is a schematic graph illustrating a threshold voltage of a thin-film transistor having a dual-gate structure.

FIG. 11 is a schematic cross-sectional view of an example of a thin-film transistor having a dual-gate structure, and FIG. 12 is a schematic graph illustrating a threshold voltage of the thin-film transistor having the dual-gate structure.

As illustrated in FIG. 11, the thin-film transistor having the dual-gate structure may include an upper gate electrode G1, a lower gate electrode G2, and a semiconductor layer SIL disposed between the upper gate electrode G1 and the lower gate electrode G2. A first (inorganic) insulating layer GIL1 may be disposed between the upper gate electrode G1 and the semiconductor layer SIL. A second (inorganic) insulating layer GIL2 and a third (inorganic) insulating layer GIL3 may be disposed between the semiconductor layer SIL and the lower gate electrode G2. For example, the second (inorganic) insulating layer GIL2 may be disposed on the third (inorganic) insulating layer GIL3. For example, the first (inorganic) insulating layer GIL1 and the second (inorganic) insulating layer GIL2 may include $SiO_x$, and the third (inorganic) insulating layer GIL3 may include $SiN_x$.

As illustrated in FIG. 12, a first threshold voltage Vth1 to a third threshold voltage Vth3 may be threshold voltages of the thin-film transistor having the dual-gate structure. The first threshold voltage may be a threshold voltage of the thin-film transistor having the dual-gate structure in an initial state.

The second threshold voltage Vth2 may be a threshold voltage that is shifted by the trapped holes as time passes. The second threshold voltage Vth2 may be a threshold voltage that is negative shifted from the first threshold voltage Vth1 by the trapped holes.

The third threshold voltage Vth3 may be a threshold voltage when a voltage of a certain size is applied to the lower gate electrode G2. For example, when the thin-film transistor having the dual-gate structure has the second threshold voltage Vth2 due to the trapped holes, the threshold voltage may be initialized when the voltage of the certain size is applied to the lower gate electrode G2.

Referring to FIG. 12, a $V_{GS}$-$I_{DS}$ curve in the case of the third threshold voltage Vth3 is shifted to the right side compared to a $V_{GS}$-$I_{DS}$ curve in the case of the second threshold voltage Vth2. As the threshold voltage is initialized, a $V_{GS}$-$I_{DS}$ curve in the case of the third threshold voltage Vth3 may be shifted to be similar to or substantially the same as the $V_{GS}$-$I_{DS}$ curve in the case of the first threshold voltage Vth1.

For example, when the voltage of the certain size is applied to the lower gate electrode G2, the second threshold voltage Vth2 may be shifted to be the third threshold voltage Vth3. As a result, the threshold voltage of the thin-film transistor may be initialized to be the same or substantially the same as the first threshold voltage Vth1. As the threshold voltage of the thin-film transistor is initialized, the $V_{GS}$-$I_{DS}$ curve may also be initialized. As a result, a deterioration of the display quality due to the hysteresis phenomenon described above may not occur or may be reduced.

According to the one or more embodiments described above, the pixel circuit in which a deterioration of a display quality is prevent or substantially prevented or reduced, and a method of driving the pixel circuit, may be realized. However, the present disclosure is not limited to the aspects and features described above.

The foregoing is illustrative of some embodiments of the present disclosure, and is not to be construed as limiting thereof. Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A pixel circuit comprising:

a driving thin-film transistor comprising a first gate electrode, a second gate electrode, and a first semiconductor layer between the first gate electrode and the second gate electrode in a cross-sectional view;

a storage capacitor comprising a first electrode electrically connected to the first gate electrode, and a second electrode spaced from the first electrode;

a bias thin-film transistor comprising a first source-drain electrode configured to receive a bias voltage and a second source-drain electrode electrically connected to the second gate electrode;

a light-emitting diode comprising an anode electrically connected to the driving thin-film transistor; and an initialization thin-film transistor connected to the first gate electrode of the driving thin-film transistor, the anode of the light-emitting diode, and an initialization voltage line configured to transmit an initialization voltage, wherein the initialization thin-film transistor comprises a first gate electrode, a second gate electrode, and a second semiconductor layer between the first gate electrode of the initialization thin-film transistor and the second gate electrode of the initialization thin-film transistor in the cross-sectional view.

2. The pixel circuit of claim 1, wherein the bias thin-film transistor is configured to be turned on to apply the bias voltage to the second gate electrode of the driving thin-film transistor.

3. The pixel circuit of claim 2, wherein, when the bias voltage is applied to the second gate electrode of driving thin-film transistor, a threshold voltage of the driving thin-film transistor is shifted by the bias voltage.

4. The pixel circuit of claim 3, wherein the driving thin-film transistor comprises a p-type metal-oxide-semiconductor (pMOS) thin-film transistor, and the bias voltage is a positive voltage.

5. The pixel circuit of claim 1, wherein the second semiconductor layer of the initialization thin-film transistor comprises an oxide semiconductor.

6. The pixel circuit of claim 1, wherein a second source-drain electrode of the initialization thin-film transistor is electrically connected to the anode of the light-emitting diode.

7. The pixel circuit of claim 6, wherein the second source-drain electrode of the initialization thin-film transistor is electrically connected to the first electrode of the storage capacitor.

8. The pixel circuit of claim 6, wherein a first source-drain electrode of the initialization thin-film transistor is electrically connected to the initialization voltage line configured to transmit the initialization voltage.

9. The pixel circuit of claim 6, wherein the second source-drain electrode of the bias thin-film transistor is electrically connected to the second gate electrode of the initialization thin-film transistor.

10. The pixel circuit of claim 9, wherein the bias thin-film transistor is configured to be turned on to apply the bias voltage to the second gate electrode of the driving thin-film transistor and the second gate electrode of the initialization thin-film transistor, and wherein the initialization thin-film transistor is configured to be turned on by the bias voltage to initialize the anode.

11. The pixel circuit of claim 9, wherein the initialization thin-film transistor comprises an n-type metal-oxide-semiconductor (nMOS) thin-film transistor.

12. The pixel circuit of claim 6, wherein the initialization thin-film transistor comprises a pMOS thin-film transistor, the bias thin-film transistor is configured to be turned on or turned off according to a control signal, and the second gate electrode of the initialization thin-film transistor is configured to receive the control signal.

13. The pixel circuit of claim 1, wherein the second electrode of the storage capacitor is electrically connected to a power voltage line configured to transmit a power voltage, and wherein the pixel circuit further comprising:

a switching thin-film transistor electrically connected to a first source-drain electrode of the driving thin-film transistor;

a first emission control thin-film transistor electrically connecting the power voltage line to the driving thin-film transistor; and a second emission control thin-film transistor electrically connected between the anode and the driving thin-film transistor.

14. A method of driving a pixel circuit, the pixel circuit comprising a driving thin-film transistor comprising a first gate electrode and a second gate electrode underneath the first gate electrode, a storage capacitor comprising a first electrode and a second electrode, and a light-emitting diode comprising an anode and configured to emit light according to a driving current received from the driving thin-film transistor, the method comprising:

shifting a threshold voltage of the driving thin-film transistor by applying a bias voltage to the second gate electrode of the driving thin-film transistor;

applying a driving voltage to the driving thin-film transistor; and transmitting the driving current to the light-emitting diode based on the shifted threshold voltage and the driving voltage, wherein the pixel circuit further comprises an initialization thin-film transistor connected to the first gate electrode of the driving thin-film transistor, the anode of the light-emitting diode, and an initialization voltage line configured to transmit an initialization voltage, and wherein the initialization thin-film transistor comprises a first gate electrode, a second gate electrode, and a second semiconductor layer between the first gate electrode of the initialization thin-film transistor and the second gate electrode of the initialization thin-film transistor in a cross-sectional view.

15. The method of claim 14, wherein the initialization thin-film transistor comprises an n-type metal-oxide-semiconductor (nMOS) thin-film transistor, wherein the second gate electrode of the initialization thin-film transistor is located underneath the first gate electrode of the initialization thin-film transistor, and wherein the shifting of the threshold voltage comprises initializing the anode by applying the bias voltage concurrently to the second gate electrode of the driving thin-film transistor and the second gate electrode of the initialization thin-film transistor.

16. The method of claim 14, wherein the pixel circuit further comprises a bias thin-film transistor electrically connected to the second gate electrode of the driving thin-film transistor, wherein the initialization thin-film transistor comprises a p-type metal-oxide-semiconductor (pMOS) thin-film transistor, wherein the bias thin-film transistor is configured to be turned on or turned off according to a control signal, and wherein the shifting of the threshold voltage comprises initializing the anode by applying the control signal to the second gate electrode of the initialization thin-film transistor.

17. An electronic device comprising:

a display area comprising a plurality of sub-pixels, each of the sub-pixels comprising a light-emitting diode, and a pixel circuit configured to drive the light-emitting diode; and a non-display area around the display area, wherein the pixel circuit comprises:

a driving thin-film transistor comprising a first gate electrode, a second gate electrode, and a first semiconductor layer between the first gate electrode and the second gate electrode in a cross-sectional view;

a storage capacitor comprising a first electrode electrically connected to the first gate electrode of the driving thin-film transistor, and a second electrode spaced from the first electrode;

a bias thin-film transistor comprising a first source-drain electrode electrically connected to the second gate electrode of the driving thin-film transistor, and a second source-drain electrode configured to receive a bias voltage; and an initialization thin-film transistor connected to the first gate electrode of the driving thin-film transistor and an initialization voltage line configured to transmit an initialization voltage, wherein the light-emitting diode comprises an anode electrically connected to the driving thin-film transistor, wherein the initialization thin-film transistor is connected to the anode of the light-emitting diode, wherein the initialization thin-film transistor comprises a first gate electrode, a second gate electrode, and a second semiconductor layer between the first gate electrode of the initialization thin-film transistor and the second gate electrode of the initialization thin-film transistor in the cross-sectional view, and wherein the electronic device is one of a cellular phone or a television.

18. The electronic device of claim 17, wherein the bias thin-film transistor is configured to be turned on to apply the bias voltage to the second gate electrode of the driving thin-film transistor, and wherein, when the bias voltage is applied to the second gate electrode of the driving thin-film transistor, a threshold voltage of the driving thin-film transistor is shifted by the bias voltage.

* * * * *